(12) United States Patent
Imai et al.

(10) Patent No.: US 8,047,104 B2
(45) Date of Patent: Nov. 1, 2011

(54) VIBRATION BODY FOR CUTTING, VIBRATION CUTTING UNIT, PROCESSING APPARATUS, MOLDING DIE AND OPTICAL ELEMENT

(75) Inventors: Toshiyuki Imai, Hachioji (JP); Shigeru Hosoe, Hachioji (JP); Hiroyuki Matsuda, Sagamihara (JP)

(73) Assignee: Konica Minolta Opto, Inc., Tokyo (JP)

( * ) Notice: Subject to any disclaimer, the term of this patent is extended or adjusted under 35 U.S.C. 154(b) by 1356 days.

(21) Appl. No.: 11/639,624

(22) Filed: Dec. 14, 2006

(65) Prior Publication Data

US 2007/0164636 A1    Jul. 19, 2007

(30) Foreign Application Priority Data

Dec. 19, 2005    (JP) .................................. 2005-365641

(51) Int. Cl.
*B23B 25/00*    (2006.01)
*H01L 41/00*    (2006.01)

(52) U.S. Cl. ............................. 82/1.11; 82/163; 82/904

(58) Field of Classification Search .................. 407/103, 407/104; 310/323.18; 82/904, 163, 76, 1.11; 409/141, 143, 11, 17
See application file for complete search history.

(56) References Cited

U.S. PATENT DOCUMENTS 2,553,251 A * 5/1951 Gutterman ...................... 310/30
7,730,815 B2 * 6/2010 Imai et al. ........................ 82/118

FOREIGN PATENT DOCUMENTS

| JP | 09-309001 | 12/1997 |
| JP | 2000-052101 | 2/2000 |
| JP | 2000-218401 | 8/2000 |
| JP | 2002-126901 | 5/2002 |

* cited by examiner

*Primary Examiner* — Will Fridie, Jr.
(74) *Attorney, Agent, or Firm* — Cozen O'Connor

(57) ABSTRACT

In a vibration cutting unit, a root portion of a holding member for supporting a vibration body is fixed on a fixed portion of a node portion which is common to axial vibration and bending vibration, on a jointless basis. Therefore, the node portion, namely, a vibration body main part is firmly fixed, thereby, the vibration body main part is supported stably, and vibrations of the vibration body main part is stabilized. In other words, vibrations under the mode where the vibration body main part cannot be controlled can be restrained, and works representing objects to be processed can be processed accurately.

19 Claims, 15 Drawing Sheets

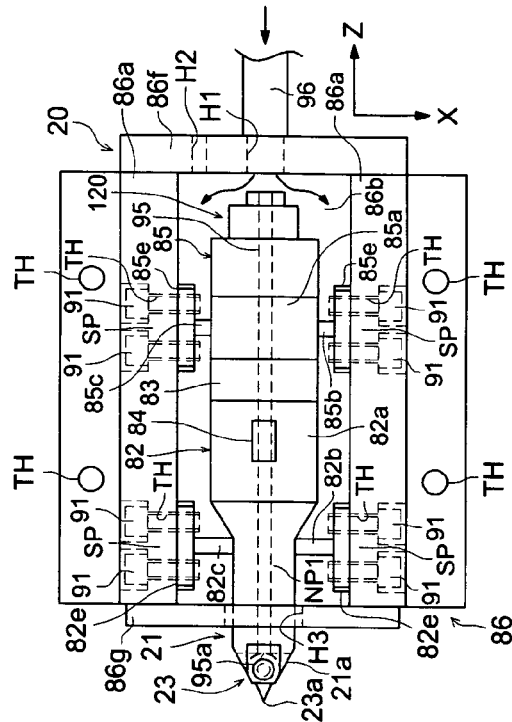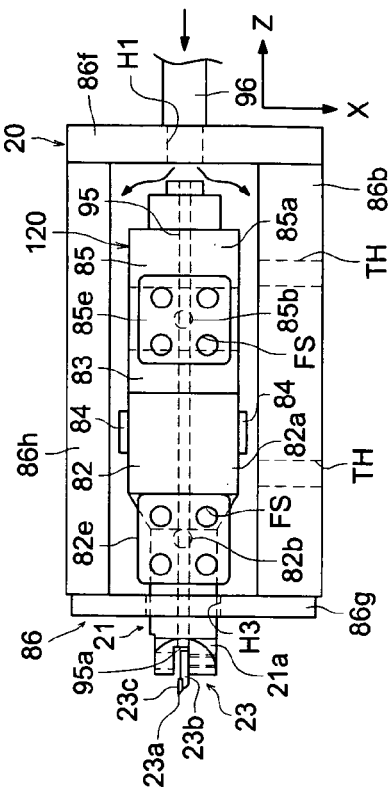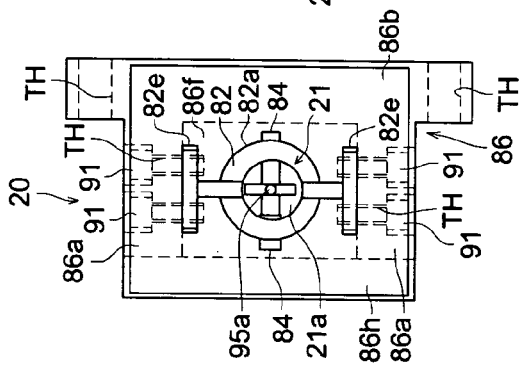

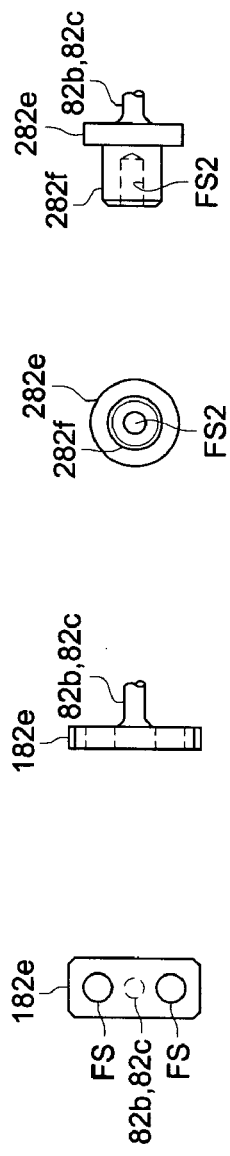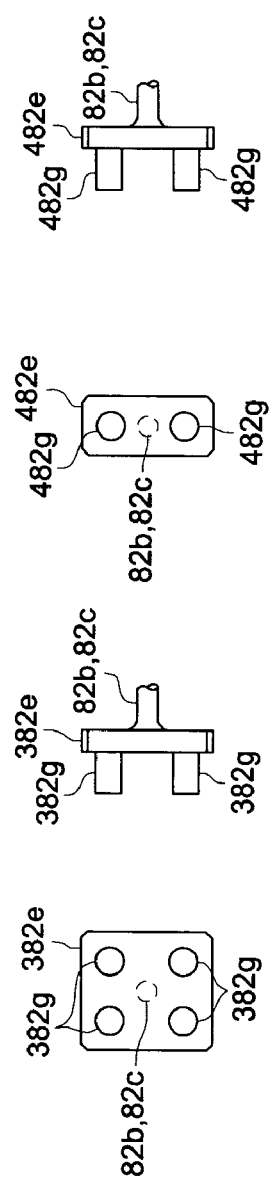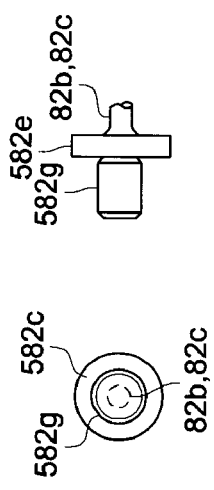

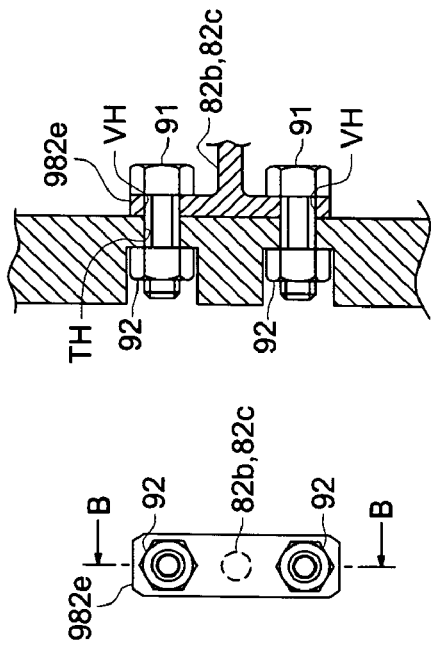
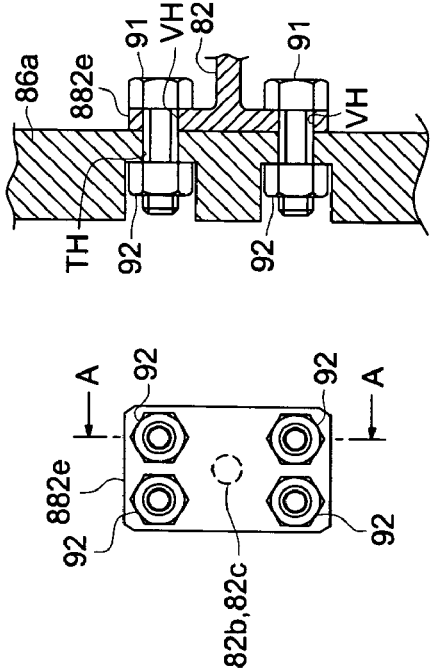
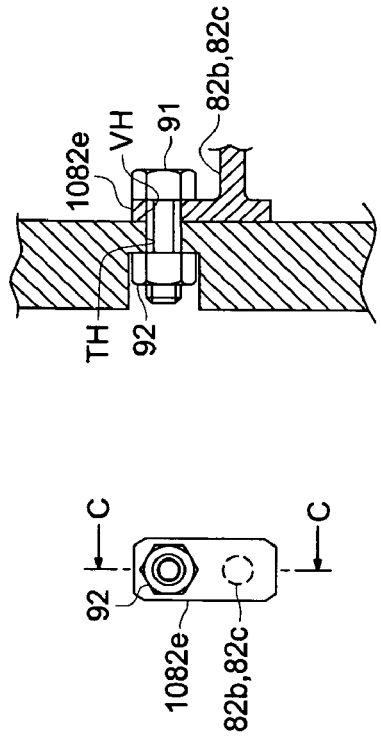

VIBRATION BODY FOR CUTTING, VIBRATION CUTTING UNIT, PROCESSING APPARATUS, MOLDING DIE AND OPTICAL ELEMENT

This application is based on Japanese Patent Application No. 2005-365641 filed on Dec. 19, 2005 in Japanese Patent Office, the entire content of which is hereby incorporated by reference.

BACKGROUND OF THE INVENTION

The present invention relates to a vibration body for cutting, a vibration cutting unit and a processing apparatus which are used suitably for cutting operations of materials for forming a molding die for an optical element and others, as well as to a molding die made by using the processing apparatus, and to an optical element.

There is a technology to conduct cutting operations for materials including hard metal and glass which are cutting-resistant materials by vibrating a tip of a cutting tool such as a diamond tool, which is called vibration cutting. This technology is one to realize cutting operations causing less stress for both a cutting tool and a material to be cut, by the effects that a fine cut-in is carried out at high speed by vibration of a cutting edge, and chips generated in this case are bailed out by the vibrating cutting edge (for example, see Patent Documents 1, 2, 3 and 4). Owing to this vibration cutting operation, an amount of critical cut-in required for ordinary ductile mode cutting is improved to the level of several times, which makes it possible to conduct cutting operations for cutting-resistant materials at high efficiency.

In this vibration cutting operations, high speed vibration of 20 kHz or more is usually used for improving processing efficiency, because, if a frequency of vibration is enhanced, the aforesaid effects are also increased and cutting feed rate for the tool is enhanced in proportion substantially to the frequency. There is also an advantage that unpleasant noises are not generated from neither oscillator nor vibration body excited by the oscillator, because the aforesaid frequency of vibration exceeds a human audible zone.

As a method to generate the high speed vibration of this kind on a cutting edge of a cutting tool, steady vibration has been put to practical use as a standing wave by exciting a holding member that holds a tool with a piezoelectric element or with a super-magnetostrictor and by causing this holding member to resonate by bending vibration and axial vibration. In the method of this kind, the vibration body that supports a cutting tool is fixed with a flange-shaped supporting body provided on the outer periphery of the vibration body at a position of the vibration node or is clamped by screw-shaped supporting members at a position of the node portion of vibration to be fixed in a way that the vibration body is pressed by the pressure surrounding the vibration body.

(Patent Document 1) Unexamined Japanese Patent Application Publication No. 2000-52101
(Patent Document 2) Unexamined Japanese Patent Application Publication No. 2000-218401
(Patent Document 3) Unexamined Japanese Patent Application Publication No. 9-309001
(Patent Document 4) Unexamined Japanese Patent Application Publication No. 2002-126901

However, when the vibration body is fixed with a flange-shaped supporting body provided on the outer periphery of the vibration body, especially the restraint against a bending vibration is too strong and problems is caused so that the vibration body cannot provides the specific performance, causes a large vibration energy loss, increases a heating value, and accordingly, it is difficult to employ the structure for a bending vibration. Therefore, a structure for fixing the vibration body by clamping the vibration body with screw-type supporting members in a way that the vibration body is pressed by the pressure surrounding the vibration body is desired.

However, when the vibration body is clamped by screw-shaped supporting members, rigidity for holding the oscillator is lowered, and when conducting high precision processing such as that for an optical surface, a problem of an irregularity pattern is caused on the processed surface by uncontrollable vibration called chatter marks.

Further, when the screw-shaped supporting members supporting the vibration body are loosened, or when a heavy load is applied on the oscillator, there have sometimes been problems where a position for supporting the vibration body is changed and the state of vibration of the vibration body is worsened.

In view of the aforesaid background, an objective of the present invention is to provide an vibration body for cutting operation having an appropriate restraint against bending vibration wherein generation of chatter marks can be controlled and a change in a position of supporting the vibration body can be controlled, a vibration cutting unit and a processing apparatus in which the vibration body for cutting operation is incorporated.

Further objective of the invention is to provide a molding die and an optical element made accurately by using the aforesaid vibration cutting unit.

SUMMARY

To solve the aforesaid problems, the vibration body for cutting relating to the invention is equipped with (a) a vibration body main part that can hold a cutting tool for vibration cutting, and transmits a vibration to the cutting tool when holding the cutting tool, and with (b) a holding member that extends in the normal line direction on the bending vibration plane of the vibration body main part from the node portion and is fixed integrally to a node portion of the vibration body main part to support that node portion which corresponds positionally to a node of vibration concerning at least bending vibration when the vibration body main part vibrates. In this case, the expression of "fixed integrally" means that the holding member is fixed to the node portion on a Pointless basis and that the surfaces of the members are fixed to each other, and the vibration body main part and the holding member do not necessarily need to be of the same material. In the meantime, when a material of the vibration body main part is different from that of the holding member, the aforesaid fixing integrally includes this state regardless of the condition in which composition changes on the boundary between the vibration body main part and the holding member. The words "node portion" is a specific range including the vibration node relating to wave length of the bending vibration and the range is a round range that has a radius of one tenth of the wavelength of the bending vibration with the node being the center of the range.

As for the word "node", the point at which the amplitude of vibration becomes minimum is called a node, for example, when detecting vibration amplitude by using detector which is used to put the contact shoe on the surface of the vibration body while the vibration body is vibrating.

The words "support at the node portion" means to support the same range of the node portion on the bending vibration plane or a part of the range in the node portion. If a portion away from the node portion is supported, a part having a vibration amplitude is compulsorily fixed, resulting in large heat generation and low vibration efficiency.

When the vibration body is used under the condition where an axial vibration is combined to the bending vibration, it is preferable to make the node of the axial vibration conform to the position of the holding member.

The vibration cutting unit relating to the invention is equipped with (a) the aforesaid vibration body for cutting and (b) a case member that houses therein the vibration body for cutting and has a supporting portion that fixes the tip side of a holding member.

The processing apparatus relating to the invention is equipped with (a) the aforesaid vibration cutting unit and (b) a driving device that drives the vibration cutting unit so that it is displaced.

BRIEF DESCRIPTION OF THE DRAWINGS

FIGS. 1 (a), 1 (b) and 1 (c) are respectively a top view, a side view and an end face view of the vibration cutting unit of the first embodiment.

Figure 3:
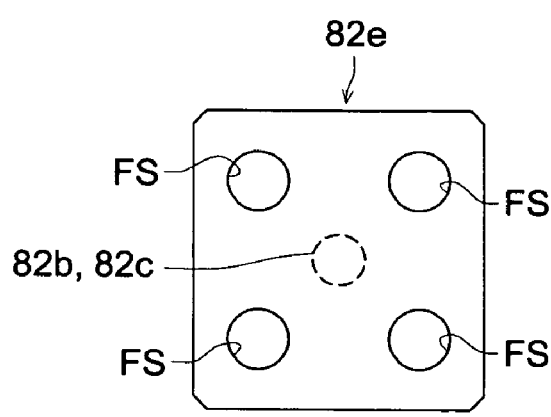
FIGS. 3 (a) and 3 (b) are respectively a side view and an end face view both illustrating a shape of a flange portion.
Figure 3:
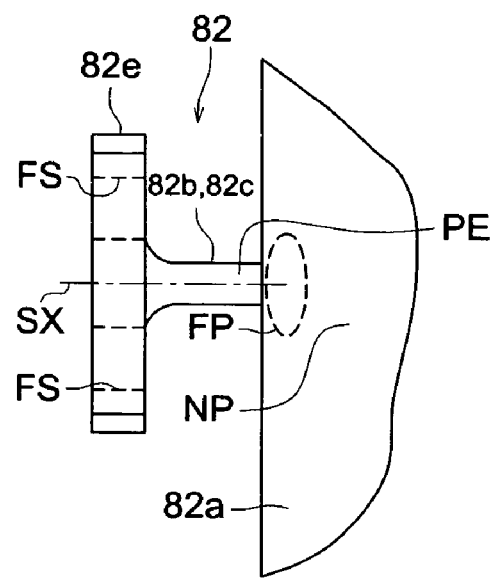

Each of FIGS. 5 (a)-5 (j) is a diagram illustrating an example of a variation of the flange portion shown in FIG. 3.

Each of FIGS. 6 (a)-6 (d) is a diagram illustrating an example of a variation of the flange portion shown in FIG. 3.

Each of FIGS. 7 (a)-7 (f) is a diagram illustrating an example of a variation of the flange portion shown in FIG. 3.

Figure 8:
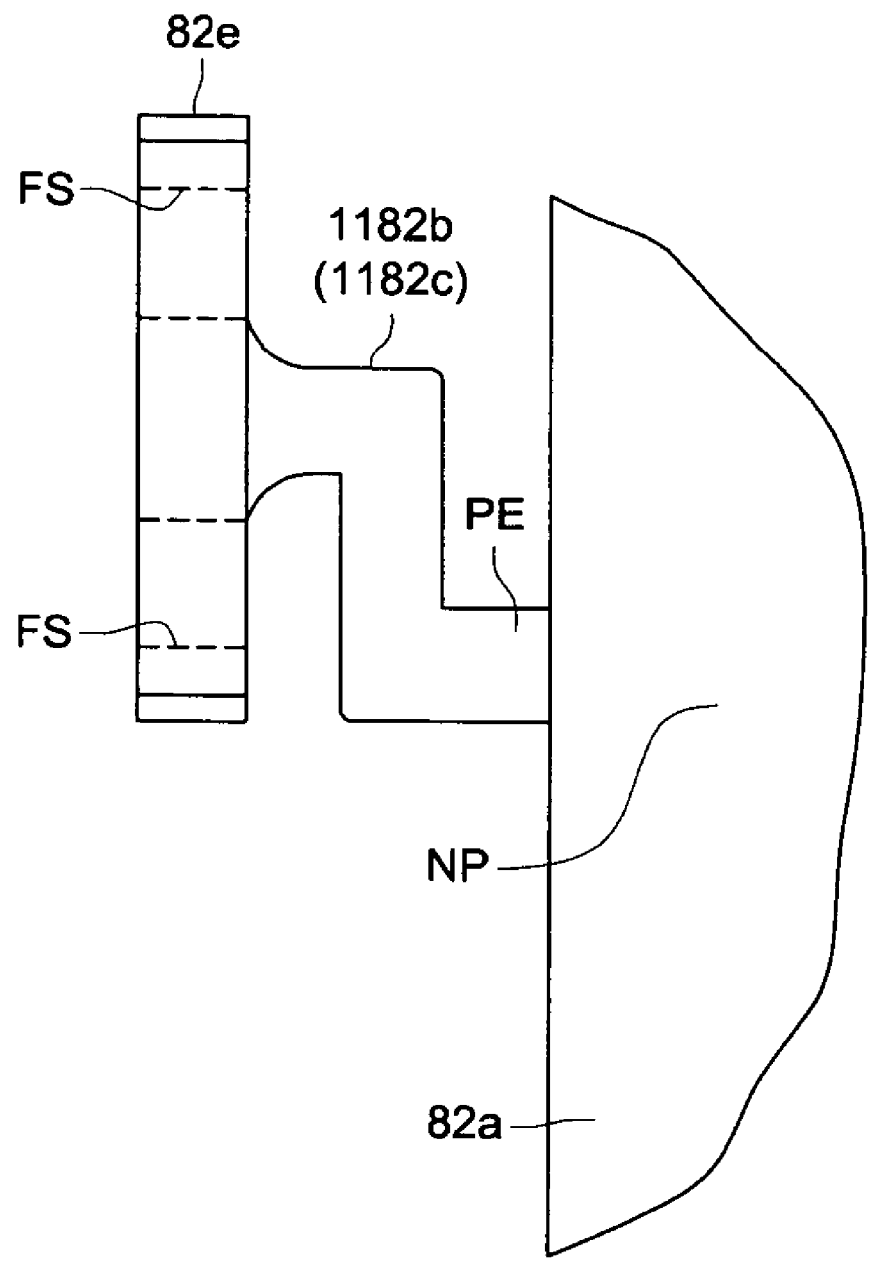

FIG. 8 is a diagram illustrating an example of a variation of a flange portion shown in each of FIGS. 5 (a) and 5 (b).

Figure 9:
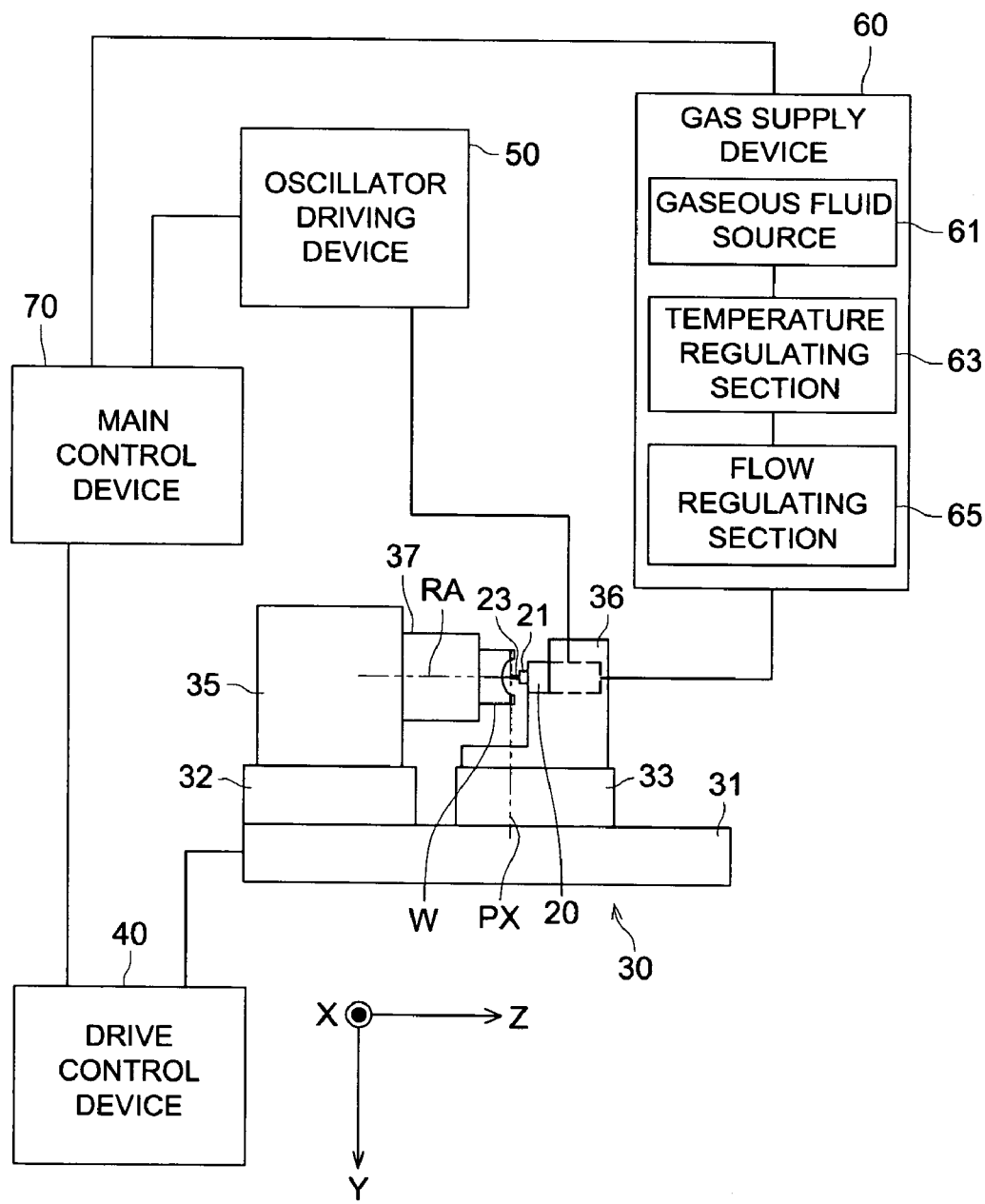

FIG. 9 is a block diagram illustrating the processing apparatus of the second embodiment.

Figure 10:
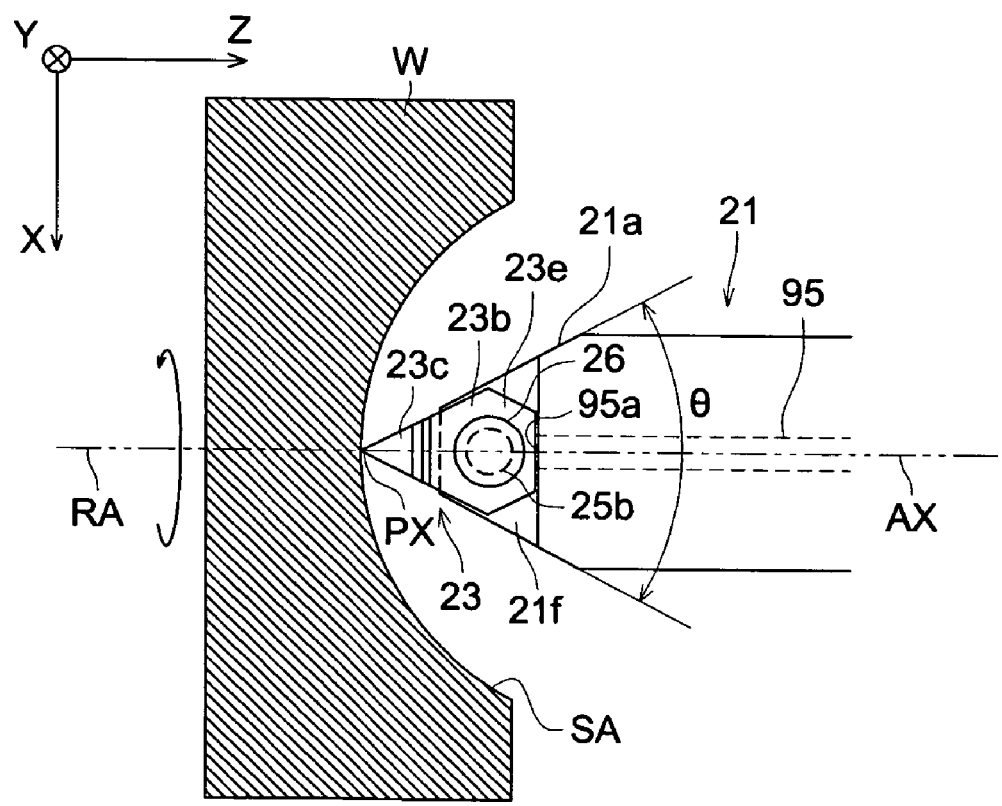

FIG. 10 is an enlarged top view illustrating the processing of a work by employing the processing apparatus shown in FIG. 9.

Figure 11:
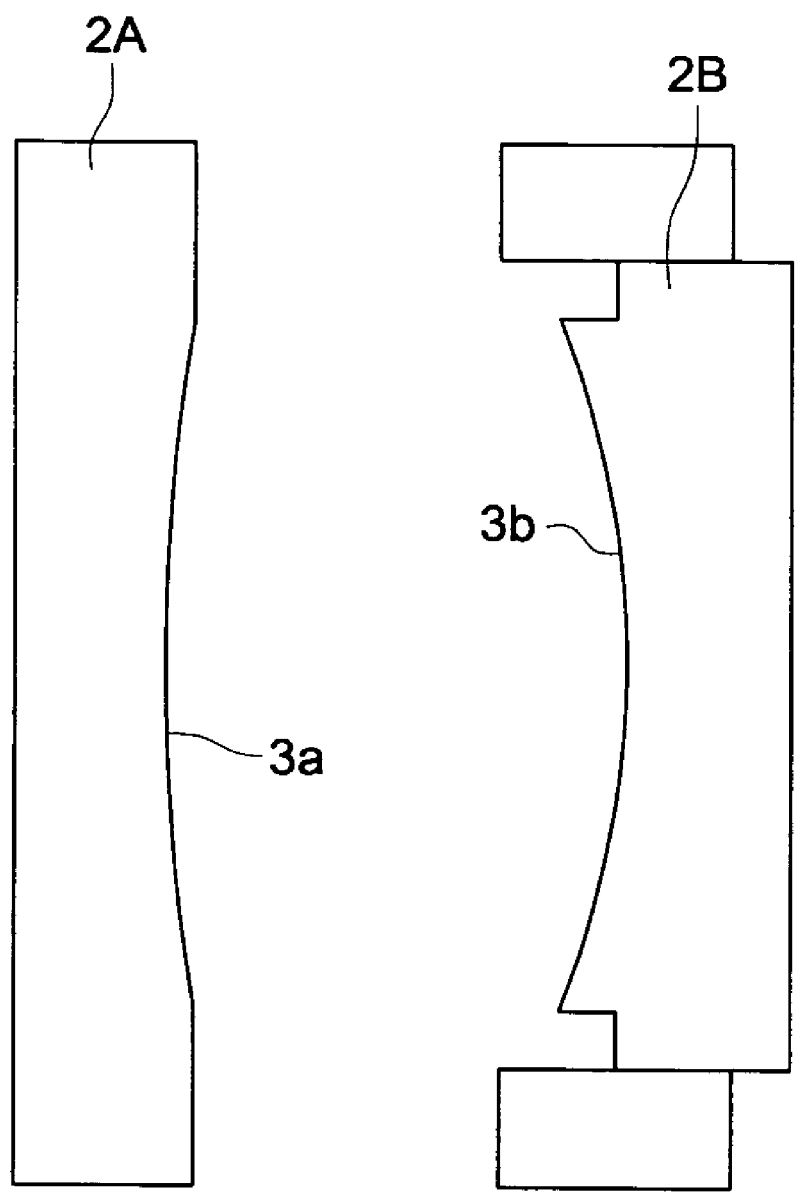

Each of FIGS. 11 (a) and 11 (b) is a side sectional view of a molding die relating to the third embodiment.

Figure 12:

FIG. 12 is a side sectional view of a lens formed by the molding die shown in FIG. 11.

Figure 13:
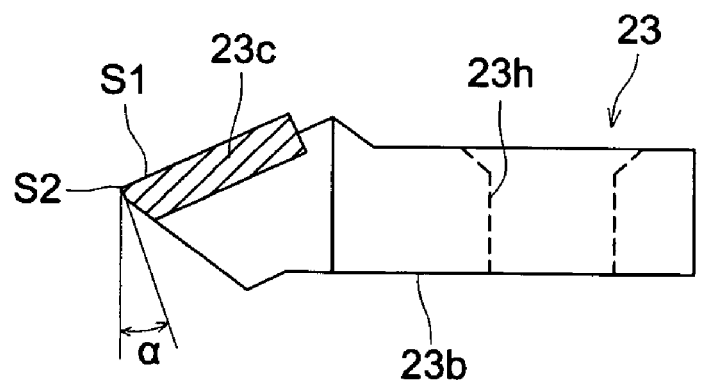

FIG. 13 is a side view illustrating a tip shape of a processing tip.

Figure 14:
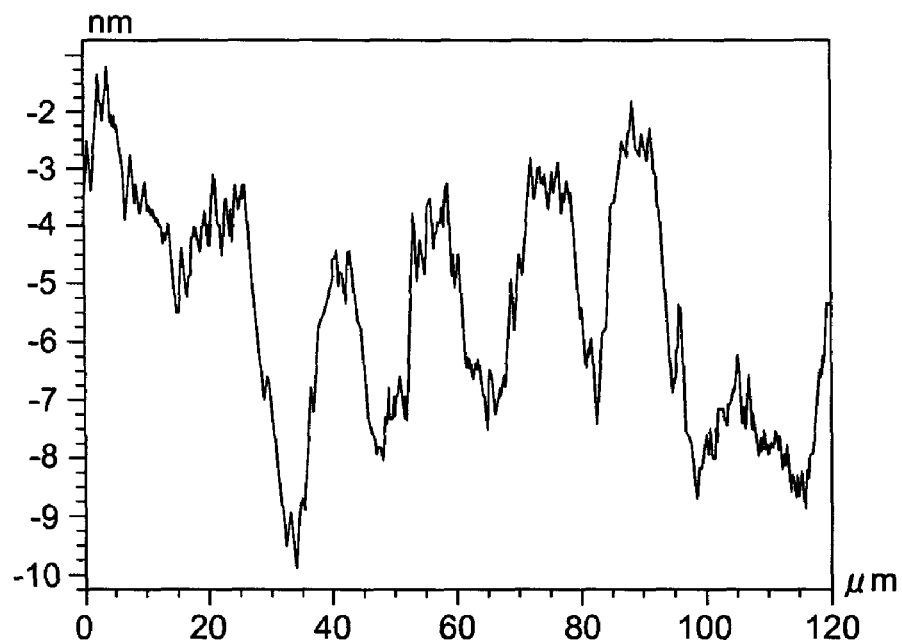

FIG. 14 is a graph illustrating surface roughness of a processed surface in the first example.

Figure 15:
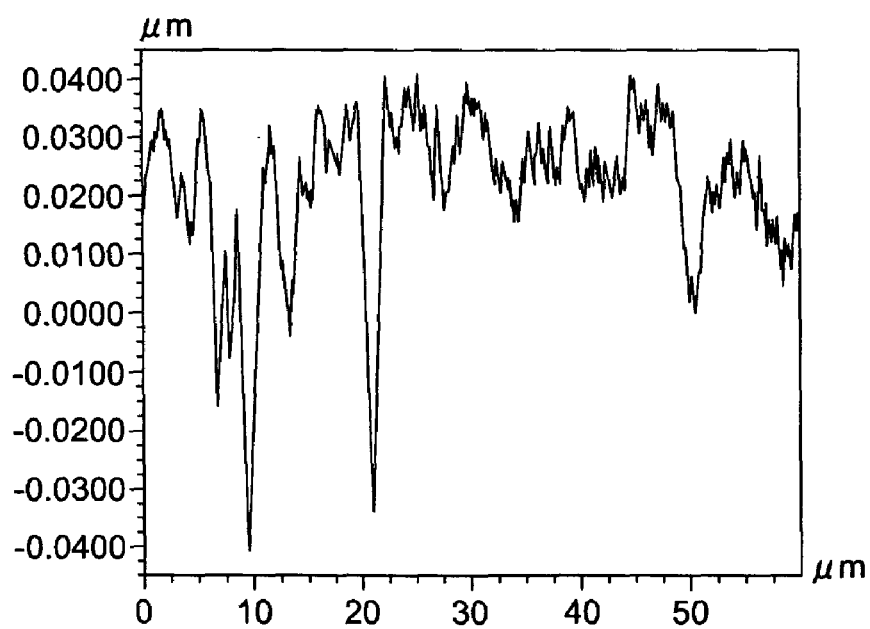

FIG. 15 is a graph illustrating surface roughness of a processed surface in the comparative example.

Figure 16:
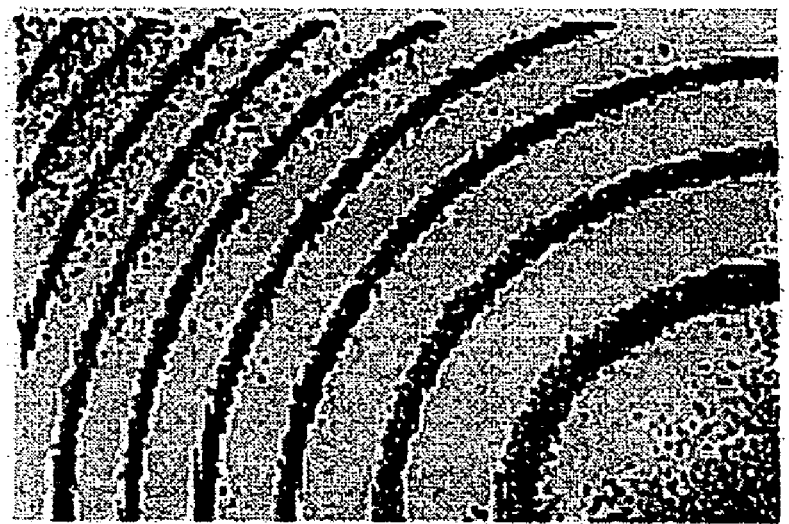

FIG. 16 shows SEM-observed image of the molding die for forming an optical element obtained by a processing method in the second example.

Figure 17:
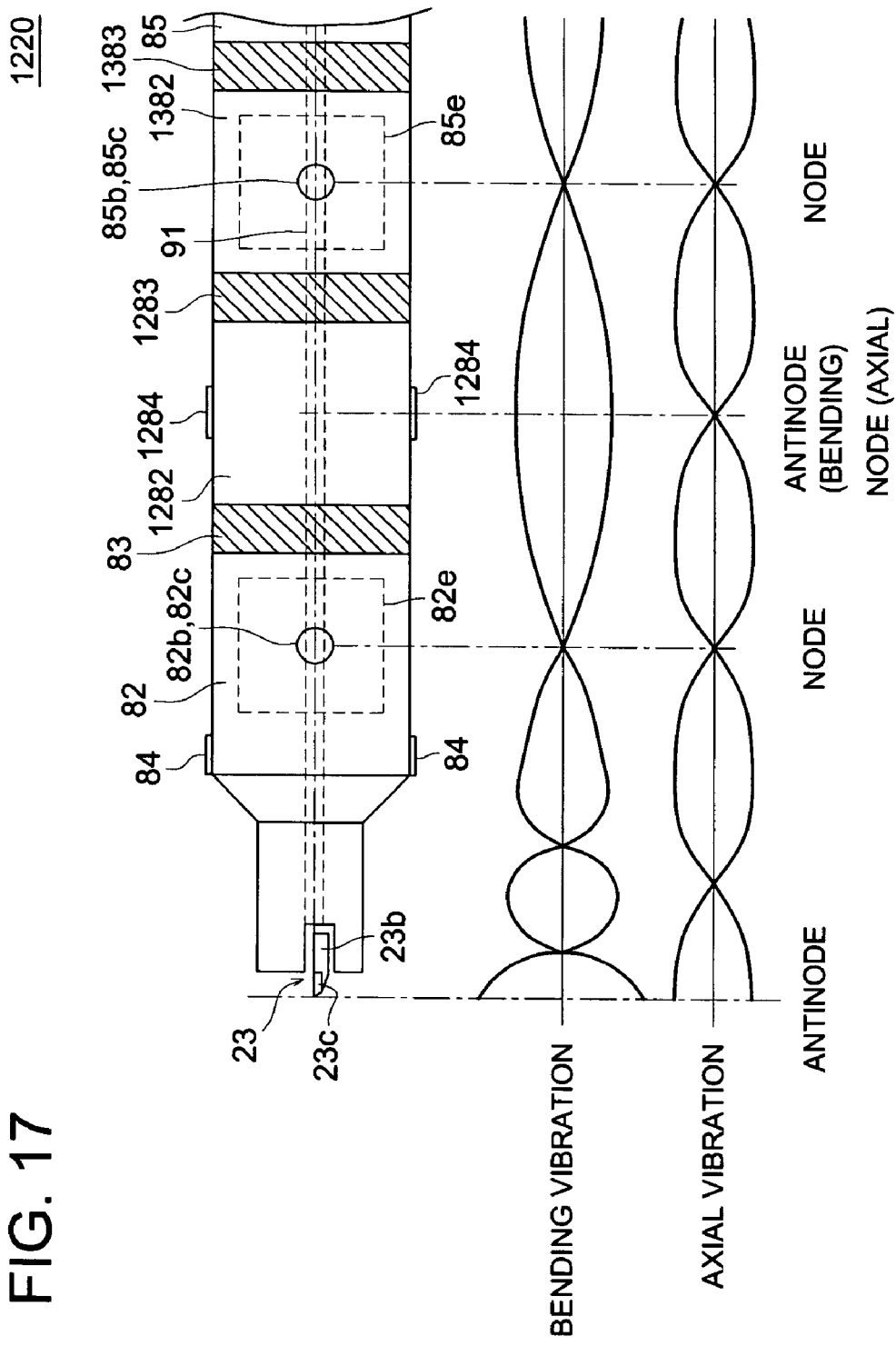

FIG. 17 is a side view illustrating the structure of a vibration body assembly which is an example of a variation.

DETAILED DESCRIPTION OF THE PREFERRED EMBODIMENT

Next, preferred embodiments of the present invention to solve the above objectives will be explained further in details.

In the aforesaid vibration body for cutting, a main part of the vibration body is supported stably and vibration of the main part of the vibration body is stabilized, because a holding member that holds a node portion of the vibration body main part is fixed integrally on the root side to the node portion. In other words, it is possible to restrain that the vibration body main part vibrates under an uncontrollable mode, and to process accurately an object by highly controlled vibration. Further, even when relatively great force is applied on the vibration body main part, the state of vibration of the vibration body main part can easily be maintained, and consistency and reproducibility of processing can be enhanced, because a change in supporting position of the vibration body main part is hardly made.

In the specific embodiment of the invention, a holding member is fixed on a node portion integrally by forming a vibration body main part and the holding member integrally in the aforesaid vibration cutting apparatus. Here, to form integrally is to put materials which constitute the vibration body main part and the holding members into a die for formation, and molding, forging and sintering can be cited as the method. The vibration body main part and the holding member are formed together with the same material to be in sufficient strength.

In another embodiment of the invention, a holding member is fixed on a node portion integrally, by forming a vibration body main part and a holding member integrally through machine work from one block of material. Here, an expression of the machine work means a cutting method, a grinding method or an electro-discharge machining method, and it also includes a combination of the aforesaid methods. In this case, the vibration body main part and the holding member are formed together with the same material to be in sufficient strength.

In still another embodiment of the invention, a holding member is fixed on a node portion integrally, by connecting a vibration body main part and a holding member by welding. In this case, the vibration body main part and the holding member are fixed each other to be in relatively high strength.

In still another embodiment of the invention, the node portion serves as a node of vibration relating to the bending vibration, while, the holding member is a member extending from the node portion in the normal line direction on bending vibration plane of the vibration body main part. In this case, a rotation on the axis of the holding member having a fulcrum on the node portion is made allowed, a loss of vibration energy is reduced and generation of unnecessary vibration can be prevented.

In still another embodiment of the invention, the node portion serves as a node of vibration relating to the axial vibration, while, the holding member is a member extending from the node portion in the direction perpendicular to the axial direction of the vibration body main part. In this case, vibration cutting utilizing axial vibration is made possible, a loss of vibration energy is reduced and generation of unnecessary vibration can be prevented.

In still another embodiment of the invention, there are provided a plurality of holding members extending from the node portion of the vibration body main part. In this case, the vibration body main part can be supported in the plural directions surrounding the vibration body main part, and supporting of the vibration body main part is stabilized.

In still another embodiment of the invention, a holding member has a connecting device for fixing on its tip side. In this case, it is possible to fix the tip of the holding member to the case member or the driving device firmly by means of the connecting device.

In still another embodiment of the invention, a vibration body main part and a holding member are formed with a material having an absolute value for linear expansion coefficient of $2 \times 10^{-6}$ or less (hereinafter referred to simply as "low linear expansion material"). In this case, expansion of the vibration body main part and the holding member can be reduced greatly, and therefore, displacement of the tip of the cutting tool can be reduced and a precision of cutting processing can be improved. Namely, when the vibration body main part is formed with a low linear expansion material, expansion of the vibration body main part can be reduced greatly, whereby, it is possible to prevent that a tip of the cutting tool that is fixed on a tip, for example, of the vibration body main part is greatly displaced in the course of cutting processing, and improvement of accuracy of cutting processing can be attained.

In the aforesaid vibration cutting unit, the vibration body main part of the vibration body for cutting is housed in a case member by holding it through the holding member and a supporting portion, thus, an object to be processed can be worked highly accurately, by controlling the state of vibration of the vibration body main part accurately while being protected by the case member. Further, even when relatively great force is applied on the vibration body main part, the state of vibration of the vibration body main part can easily be maintained, and consistency and reproducibility of processing can be enhanced, because a change of position of the vibration body main part with respect to the case member is hardly made.

In the specific embodiment of the invention, a flange portion that comes in contact with a supporting portion of the case member from the inner surface side, and a connecting member for fixing the flange portion on the supporting portion on a detachable basis are provided in the aforesaid vibration cutting unit. In this case, a tip side of the holding member can be fixed stably on the case member under the state where the flange portion is in contact with an inner surface of the case member.

In another embodiment of the invention, the connecting member includes a plurality of screws, and a supporting portion is fixed on the flange portion at plural locations by these plural screws. In this case, the vibration body for cutting can be fixed on the case member on a removable basis by a simple mechanism. Further, the state of vibration of the vibration body main part is further stabilized, because a rotation of the holding member is blocked by the plural screws.

In still another embodiment of the invention, the connecting member is at least one screw member provided outside the flange portion. In this case, the vibration body for cutting can be fixed and removed simply and surely.

In still another embodiment of the invention, the vibration body for cutting has a plurality of holding members extending from the vibration body main part, and the case member has plural supporting portions each fixing a tip side on each of the plural holding members. In this case, the vibration body main part can be supported in the case member in the plural directions through supporting portions, resulting in stable supporting of the vibration body main part.

In still another embodiment of the invention, the case member is formed integrally on the main part including plural supporting portions. In this case, fixing of the vibration body main part on the case member is stabilized, and processing accuracy can be enhanced because the relative positions of plural supporting portions do not change mechanically.

In still another embodiment of the invention, the case member, the vibration body main part and the holding member are formed with the same material. In this case, linear expansion coefficients for the case member, the vibration body main part and the holding member turn out to be the same, thereby, it is possible to prevent that unintended stress comes into play between the case member and the vibration body for cutting, and reliability of a vibration cutting unit can be enhanced.

In still another embodiment of the invention, a cutting tool that is held on the vibration body main part and a fixing device that fixes the cutting tool on the vibration body main part on a detachable basis are further provided. In this case, the cutting tool can be fixed firmly on the vibration body main part that vibrates accurately on a replaceable basis.

In still another embodiment of the invention, there is further provided a vibration source that causes the cutting tool to vibrate through the vibration body main part, by giving vibration to the vibration body main part. In this case, it is possible to generate necessary vibration by supplying electric power to the vibration cutting unit.

In the aforesaid processing apparatus, highly accurate processing can be realized by the vibration cutting unit capable of controlling the state of vibration of the vibration body main part at high accuracy, because the vibration cutting unit explained above is displaced by the driving device.

A molding die relating to the invention has a transfer optical surface for forming an optical surface of an optical element created by the use of the aforesaid vibration cutting unit. In this case, it is possible to process efficiently and accurately a mold having a concave surface and other various transfer optical surfaces.

An optical element relating to the invention is created by using the aforesaid vibration cutting unit. In this case, it is possible to obtain a highly accurate optical element having a concave surface and other various optical surfaces.

First Embodiment

Figure 2:
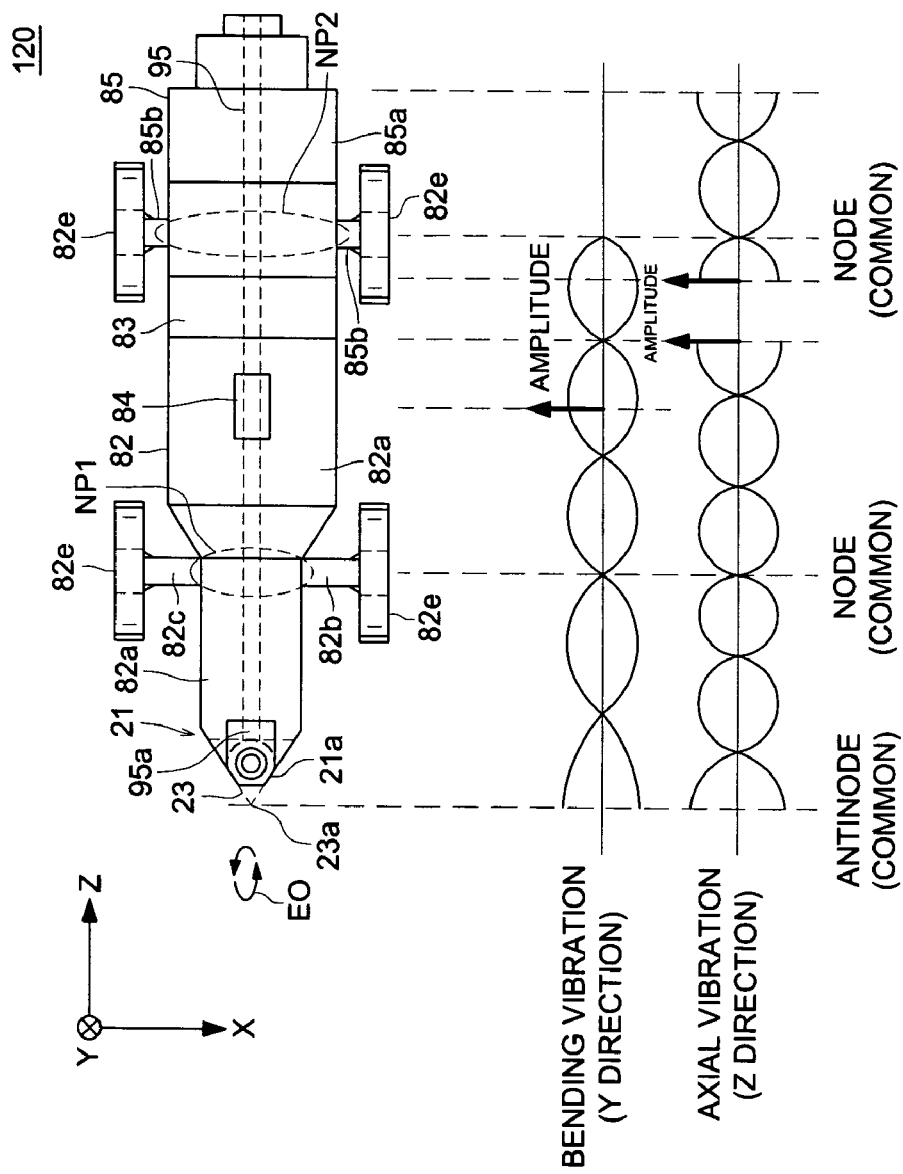
FIG. 2 is a top view of a vibration body assembly.

A vibration body and a vibration cutting unit relating to the first embodiment of the invention will be explained as follows, referring to the drawings. FIG. 1 (*a*) is a top view illustrating the structure of the vibration cutting unit that is used in the case of processing an optical surface of a molding die for forming an optical element such as a lens, FIG. 1 (*b*) is a side view of a vibration cutting unit, and FIG. 1 (*c*) is an end face view of the vibration cutting unit. FIG. 2 is a top view of a vibration body assembly that is incorporated in the vibration cutting unit shown in FIG. 1.

As shown in FIGS. 1 (*a*)-1 (*c*), the vibration cutting unit 20 is equipped with cutting tool 23, vibration body for cutting 82, axial oscillator 83, bending oscillator 84, counterbalance 85 and case member 86. Incidentally, one set portion including axial oscillator 83, bending oscillator 84 and counterbalance 85 in addition to vibration body for cutting 82 constitutes vibration body assembly 120, and this vibration body assembly 120 can be regarded as an integrated type vibration body for cutting that is driven from the outside to vibrate under the expected condition.

In this case, the cutting tool 23 is embedded to be fixed in tip portion 21*a* of tool portion 21 that is on the tip side of vibration body for cutting 82 of vibration cutting unit 20. In the cutting tool 23, symbol 23*a* represents a cutting edge of a diamond tip, and it vibrates together with vibration body for cutting 82 as an open end of the vibration body for cutting 82 which is made to be in the state of resonance. In other words, the cutting tool 23 generates a vibration to be displaced in the Z direction caused by axial vibration of vibration body for cutting 82, and generates a vibration to be displaced in the Y direction caused by bending vibration of vibration body for cutting 82. The bending vibration among these vibrations is supposed to exist in a bending vibration plane that is in parallel with YZ plane in the illustrated example. As a result, tip 23*a* of cutting tool 23 draws elliptical orbit EO to be displaced at high speed. Incidentally, in FIG. 2, though elliptical orbit EO is drawn to spread slightly in XZ plane for easy understanding, actual elliptical orbit EO drawn by tip 23a exists in a plane that is in parallel with YZ plane.

The vibration body for cutting 82 is a vibration body for cutting formed integrally with low linear expansion material having an absolute value of linear expansion coefficient of $2\times10^{-6}$ or less, and specifically, invar material, super-invar material and stainless invar material are used suitably. In the meantime, a linear expansion coefficient for the material for vibration body for cutting 82 is as relatively large as about $6\times10^{-6}$, and hard metal can also be used.

The invar material in this case, is an alloy containing Fe and Ni, and it is an iron alloy containing 36 atom % of Ni whose linear expansion coefficient at a room temperature is usually $1\times10^{-6}$ or less. Although its Young's modulus is as low as about a half of that of steel, when this is used as a material of vibration body 82, thermal expansion of the vibration body 82 is controlled, and temperature drift of a cutting edge position of cutting tool 23 held at its tip can be controlled.

The super-invar material is an alloy containing at least Fe, Ni and Co, and it is an iron alloy containing respectively 5 atom % or more of Ni and 5 atom % or more of Co, whose linear expansion coefficient at a room temperature is usually about $0.4\times10^{-6}$, whereby, it is a material that is more resistant than the aforesaid invar material against thermal expansion. Although its Young's modulus is as low as about a half of that of steel, when this is used as a material of vibration body 82, thermal expansion of the vibration body 82 is controlled, and temperature drift of a cutting edge position of cutting tool 23 held at its tip can be controlled.

The stainless invar material represents all alloy materials wherein primary component at 50 atom % or more is Fe, and an incidental material at 5 atom % or more is at least one of Co, Cr and Ni. Therefore, in this case, Kovar material is also included in the stainless invar material. The linear expansion coefficient at a room temperature of the stainless invar material is usually $1.3\times10^{-6}$ or less. Incidentally, the linear expansion coefficient at a room temperature of Kovar material is usually $5\times10^{-6}$ or less. Although the Young's modulus of the stainless invar material is as low as about a half of that of steel, when this is used as a material of the vibration body, thermal expansion of the vibration body 82 is controlled, and temperature drift of a cutting edge position of cutting tool 23 held at its tip can be controlled. Further, the stainless invar material is much higher than invar material in terms of resistance to moisture, whereby, it has excellent characteristics that no rust is caused even when it is exposed to a working cooling liquid, thus, it is suitable as a structural material for holding and fixing cutting tool 23.

The vibration body for cutting 82 is equipped with vibration body main part 82a that transmits a vibration to cutting tool 23, holding members 82b and 82c each supporting the vibration body main part 82a and flange portions 82e formed respectively on tip sides of holding members 82b and 82c. The vibration body main part 82a is a member whose axial direction is a Z axis direction. Though this vibration body main part 82a has an outer form of two-step cylindrical wherein diameters are different in the vicinity of node portion NP1 in the case of the illustration, it can be replaced by one having a cross-sectional view, for example, of a square, a polygon or an ellipse, under the assumption that the expected state of vibration can be secured. Two holding members 82b and 82c extending respectively in +X direction and −X direction from a side wall of the vibration body main part 82a support it at the node portion NP1 in a way to allow its operations. That is, two holding members 82b and 82c are located at the node portion and extend in the normal line direction based on the bending vibration plane parallel to the YZ plane of the vibrating body main part 82a. By means of this, the degree of freedom of the movement can be large for the bending vibration existing on the bending vibration plane parallel to the YZ plane like the present embodiment so that the restraining force can be decreased to a proper degree, compared to the flange structure of the abovementioned prior art, provided on the outer periphery and having a large restraining force. By means of this, the vibration energy loss can be minimized and the desired cutting performance can be obtained. Though each of the holding members 82b and 82c has a columnar outer form in the case of the illustration, it is possible to replace to one that has, for example, an outer form of a square pole, a polygonal pole or an elliptic pole. A root side of each of the holding members 82b and 82c is fixed integrally on node portion NP1, while, a tip side of each of the holding members 82b and 82c supports square flange portion 82e extending in the direction perpendicular to the holding member. In a more detailed explanation, both holding members 82b and 82c support the node portion NP1 of the vibration body main part 82a at side positions which face each other in terms of X direction, and an end face of each flange portion 82e provided on the tip side of each of both holding members 82b and 82c is in contact with an inner surface of case member 86 to be fixed on the case member 86. Like this case, because the root side of each supporting members 82b and 82c are integrally fixed on node portion NP1, the rigidity for supporting the vibrating body is enhanced and problems such as creation of chattering which occurs when the vibrating body is fixed with screw-shaped supports clamping the vibrating body, which is a prior art, can be prevented. Further, the possibility of causing the supporting position of vibration body to change can be eliminated.

FIG. 3 (a) is a side view of the holding members 82b and 82c and the flange portion 82e, while, FIG. 3 (b) is a diagram of an end face of the flange portion 82e. The flange portion 82e is in a form of a square plate on which through female screws FS are formed at four locations at four corners. In each female screw FS, there is screwed to be fixed a tip of bolt screw 91 representing a connecting member through hole TH provided on side wall portion 86a of case member 86 corresponding to the female screws FS, as shown in FIG. 1. Owing to this, an end face of the flange portion 82e is fixed firmly under the condition that the end face is in contact with an inner surface of the side wall portion 86a, whereby, the holding members 82b and 82c are positioned accurately on the case member 86 to be fixed. In other words, the vibration body main part 82a is fixed under the condition that it is separated from the inner surface of case member 86 to be positioned accurately in the case member 86, and is supported. In this case, the female screw FS provided on the flange portion 82e and the bolt screw 91 serve as a connecting device that fixes tips of the holding members 82b and 82c. Meanwhile, with respect to a screw groove of female screw FS and a screw thread of bolt screw 91, it is possible to select either an ordinary screw direction or a reverse screw direction to employ, by considering prevention of loosening from screw tightening.

Vibration body for cutting 82 supported in the case member 86 by the aforesaid structure is vibrated by axial oscillator 83 to result in the state of resonance wherein a standing wave causing displacement locally in the Z direction is formed. Further, the vibration body for cutting 82 is vibrated also by bending oscillator 84 to result in the state of resonance wherein a standing wave causing displacement locally in the Y direction is formed. In this case, node portion NP1 that has fixed the root sides of the holding members 82b and 82c serves as a node that is common for axial vibration and bending vibration for the vibration body for cutting 82, which can prevent that axial vibration and bending vibration are interfered by the holding members 82b and 82c.

In the meantime, the holding members 82b and 82c, flange portion 82e and vibration body main part 82a are formed integrally. In other words, root portion PE of the holding members 82b and 82c is fixed on fixing portion FP of the vibration body main part 82a on a jointless basis, as shown in FIG. 3 (*a*). Therefore, vibration body for cutting 82 is one formed through cutting of a block of material, namely, bar-shaped low linear expansion material. In the case of preparing the vibration body for cutting 82, there are combined preliminary processing by a cutting device such as, for example, a milling machine and finish processing for cutting holding members 82b and 82c as well as flange portion 82e with a cutting device of a machining center so that they have desired forms. When vibration body main part 82a and holding members 82b and 82c are cut integrally as stated above, it is possible to manufacture vibration body for cutting 82 with the same material to have sufficient strength. Owing to this, it is possible to make the vibration body for cutting 82 to vibrate under the desired state, whereby, its strength can be enhanced sufficiently, and its rigidity for holding can be enhanced extremely. Although flange portion 82e and holding members 82b and 82c are somewhat inferior in terms of strength, they can be fixed through welding. Incidentally, in place of the cutting processing explained above, it is also possible to prepare vibration body for cutting 82 by using a method of machining process such as grinding and electro-discharge machining.

The vibration body for cutting 82 can also be prepared integrally by molding in place of cutting by the machining process stated above. In this case, it is preferable to provide a process for conducting finish processing accurately for outer forms of various portions 82a, 82b and 82c as well as flange portion 82e for vibration body for cutting 82 after molding. In addition, with respect to the vibration body for cutting 82, the root side of both the holding members 82b and 82c can also be fixed on vibration body main part 82a through welding after making the root side of the holding members 82b and 82c to engage with recessed portions or screw holes formed on the side of the vibration body main part 82a. It is further possible to fix the root side of holding members 82b and 82c on the side surface of vibration body main part 82a directly through welding, without forming recessed portions or screw holes on the side surface of vibration body main part 82a.

Axial oscillator 83 is a vibration source to be connected to an end face on the root side of vibration body for cutting 82 formed by a piezoelectric element (PZT) or super-magneto-strictor, and it is connected to an oscillator drive device (described later) through an unillustrated connector and a cable. The axial oscillator 83 operates based on drive signals coming from the oscillator drive device, and conducts stretching vibration at the higher frequencies, to give a longitudinal wave in the Z direction to the vibration body for cutting 82.

Bending oscillator 84 is a vibration source to be connected to a side face on the root side of vibration body for cutting 82 formed by a piezoelectric element or super-magnetostrictor, and it is connected to an oscillator drive device (described later) through an unillustrated connector and a cable. The axial oscillator 84 operates based on drive signals coming from the oscillator drive device, and vibrates at the higher frequencies, to give a lateral wave, namely, vibration in the Y direction in the illustrated example to the vibration body for cutting 82.

Counterbalance 85 is fixed to be opposite to vibration body for cutting 82 in a way to interpose axial oscillator 83 between the counterbalance 85 and the vibration body for cutting 82. The counterbalance 85 is a vibration body for cutting formed integrally with the same material as that of the vibration body for cutting 82, and specifically, low linear expansion materials such as invar material, super invar material and stainless invar material are used suitably.

The counterbalance 85 is equipped with cylindrical vibration body main part 85a fixed coaxially on one end of axial oscillator 83, holding members 85b and 85c that support node portion NP2 of the vibration body main part 85a and with flange portions 85e each being formed on a tip side of each of holding members 85b and 85c. Though the vibration body main part 85a has a cylindrical outer form in the illustration, it can be replaced with one having a section in a form, for example, of a quadrangle, a polygon and an ellipse, under the assumption that a vibration mode is considered. Though each of two holding members 85b and 85c extending respectively in ±X directions from a side wall of the vibration body main part 85a has a cylindrical outer form in the illustration, it can be replaced with one having an outer form, for example, of a square pole, a polygonal pole and an elliptic cylinder. The root side of holding member 85b and that of holding member 85c are fixed to node portion NP2 integrally, and a tip side of each of holding members 85b and 85c supports square flange portion 85e extending in the direction perpendicular to the holding member. In other words, both holding members 85b and 85c support the node portion NP2 of the vibration body main part 85a at side positions which face each other in terms of X direction, and an end face of each flange portion 85e provided on the tip side of each of both holding members 85b and 85c is in contact with an inner surface of case member 86 to be fixed on the case member 86 by bolt screw 91. Incidentally, forms and structures of holding members 85b and 85c as well as of flange portion 85e are the same as those shown in FIGS. 3 (*a*) and 3 (*b*), and a method of fixing by bolt screw 91 is also the same, therefore, the detailed explanation will be omitted.

Counterbalance 85 supported together with vibration body for cutting 82 in the case member 86 by the aforesaid mechanism is vibrated by axial oscillator 83 to result in the state of resonance wherein a standing wave causing displacement locally in the Z direction is formed. In this case, node portion NP2 that has fixed the root sides of the holding members 85b and 85c serves as a node that is common for axial vibration and bending vibration for counterbalance 85, which can prevent that axial vibration and bending vibration are interfered by the holding members 85b and 85c.

In the meantime, in counterbalance 85, the holding members 85b and 85c, flange portion 85e and vibration body main part 85a are formed integrally. In other words, the counterbalance 85 is formed integrally on a jointless basis, in the same way as in vibration body for cutting 82. The counterbalance 85 is formed by cutting a block of material, namely, by cutting bar-shaped material. Owing to this, it is possible to make the counterbalance 85 to vibrate under the desired state, whereby, its strength can be enhanced sufficiently, and its rigidity for holding can be enhanced extremely. The counterbalance 85 can also be formed integrally through molding. The counterbalance 85 can further be one wherein the root side of each of holding members 82b and 82c is fixed to the side surface of vibration body main part 85a through welding.

The case member 86 is a portion in which vibration body assembly 120 that is composed of vibration body for cutting 82 and counterbalance 85 is supported and fixed. The case member 86 is one to fix vibration cutting unit 20 on a processing apparatus (which will be described later) that is for driving the vibration cutting unit 20. Therefore, holes TH for fixing to the processing apparatus are formed at appropriate locations on bottom portion 86*b* of the case member 86. Further, holes TH for fixing flange portions 82*e* and 85*e* extending from vibration body for cutting 82 or counterbalance 85 are formed at appropriate locations on a pair of side wall portions 86*a* which are formed integrally with the bottom portion 86*b*. Portions on which these holes TH are formed are supporting portions SP for supporting vibration body for cutting 82 and counterbalance 85. In this case, side wall portion 86*a* and bottom portion 86*b* among case members 86 are formed integrally on a jointless basis as a main part. Accordingly, it is possible to support the vibration body assembly 120 in the case member 86 by positioning the vibration body assembly 120 accurately, and thereby, to enhance the strength of the case member 86 sufficiently and to enhance rigidity for holding extremely, in addition to enhancing its holding strength. The side wall portion 86*a* and the bottom portion 86*b* can be formed with the same material (preferably, low linear expansion material) as that of, for example, vibration body for cutting 82. The main part wherein side wall portion 86*a* and bottom portion 86*b* are united integrally is formed through cutting of, for example, a block of material, namely, bar-shaped material, and it can also be formed integrally through molding, or through welding of plural plate materials.

On an end surface on one side of case member 86, there is fixed airtightly rear end plate 86*f*, on an end surface on the other side of case member 86, there is fixed airtightly front end plate 86*g* and on the top of case member 86, there is fixed airtightly top plate 86*h*. On the rear end plate 86*f*, there is formed opening H1 connected to air-supply pipe 96, and there is also formed opening H2 which allows a connector and a cable extending from oscillators 83 and 84 to pass through. The air-supply pipe 96 is connected to a gas-supply device (described later) which supplies pressurized dry air established to the desired rate of flow and temperature. On the other hand, on the front end plate 86*g*, there is formed opening H3 which allows tool portion 21 of vibration cutting unit 20 to pass through. In the vibration cutting unit 20, vibration body for cutting 82, axial oscillator 83 and counterbalance 85 are jointed and fixed by, for example, brazing, so that axial oscillator 83 can vibrate efficiently. On center of axle of each of the vibration body for cutting 82, axial oscillator 83, and counterbalance 85, there is formed through hole 95 that passes through them in a way to traverse their joint surfaces, and pressurized dry air coming from air-supply pipe 96 runs through the through hole. In other words, the through hole 95 is a supply path to send out pressurized dry air, and it constitutes a cooling device for cooling vibration cutting unit 20 from its inside, together with an unillustrated gas supply device and air supply pipe 96. A tip portion of the through hole 95 is communicated with a holding groove into which cutting tool 23 is inserted to be fixed, and pressurized dry air introduced to the through hole 95 can be supplied to the periphery of the cutting tool 23. Further, a tip of the through hole 95 still has a gap even when the cutting tool 23 is fixed, and therefore, pressurized dry air is jetted at high speed from opening 91*a* that is formed to be adjacent to the cutting tool 23, whereby, a working point at the tip of the cutting tool 23 can be cooled efficiently, and chips adhering to the working point and its periphery can be removed surely by an air current. Meanwhile, a part of pressurized dry air introduced to case member 86 from air-supply pipe 96 cools vibration body assembly 120 from the outside while passing through the periphery of the vibration body assembly 120, to be jetted out to the outside of case member 86 through a gap of opening H3.

Figure 4:
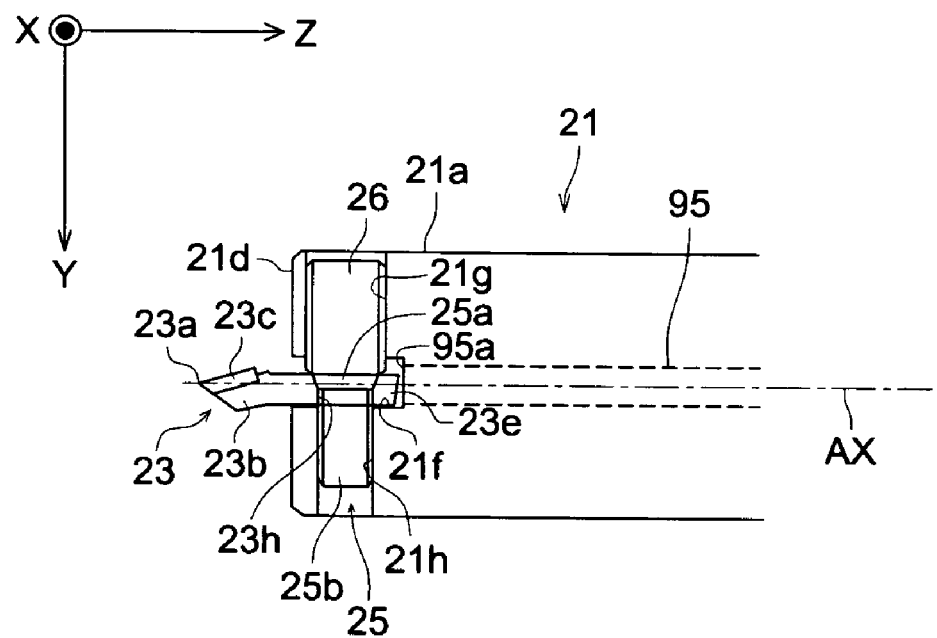
FIGS. 4 (a) and 4 (b) are respectively an end face view and a top view of a tip of a tool portion.
Figure 4:
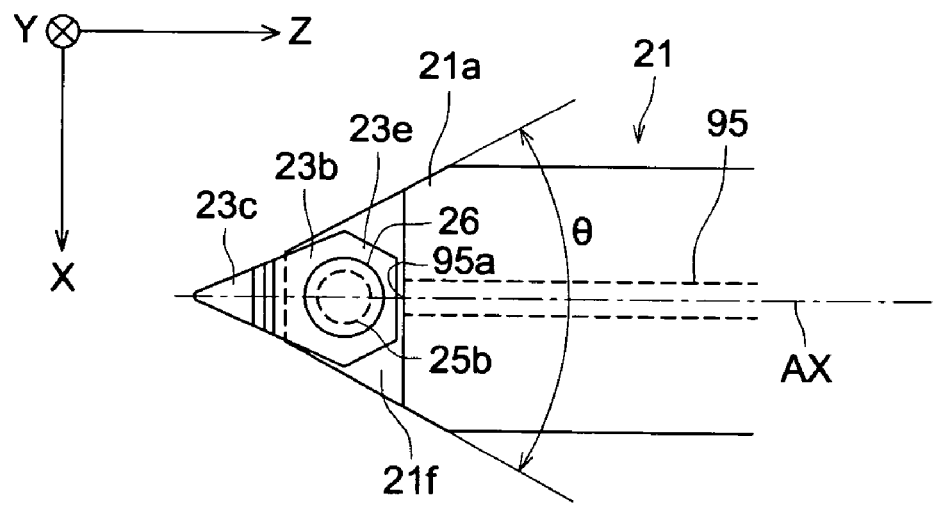
Figure 6A:
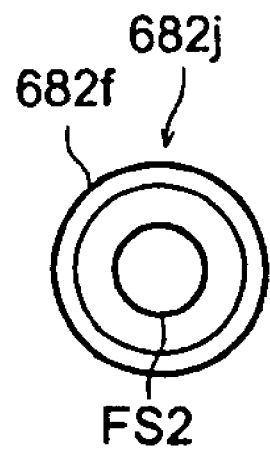
Figure 6B:
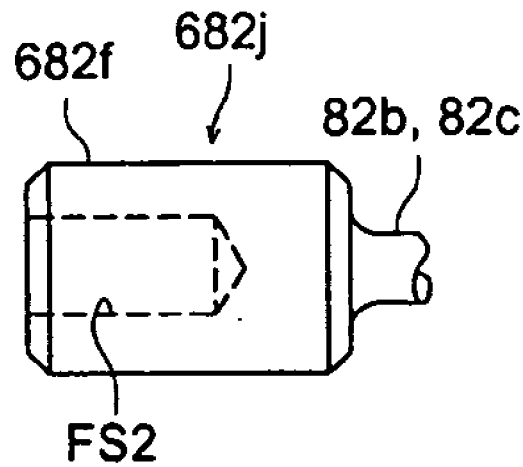
Figure 6C:
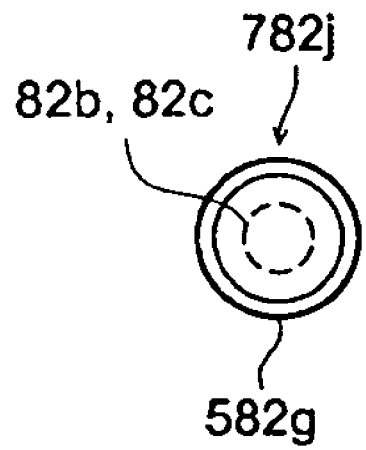
Figure 6D:
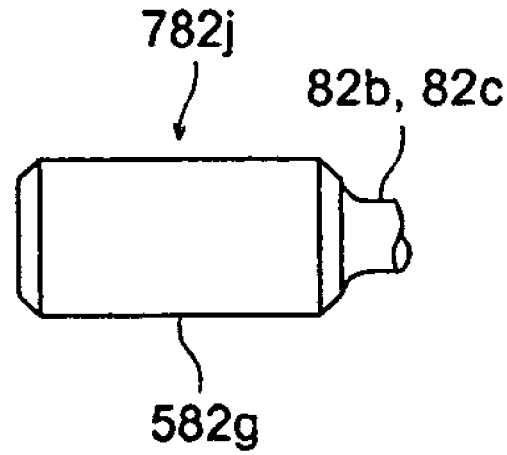

FIGS. 4 (*a*) and 4 (*b*) are respectively a side sectional view and a top sectional view of a tip of a tool portion 21 shown in FIG. 2.

As is apparent from FIG. 4, tip portion 21*a* provided on tool portion 21 has a wedge form that is a square form on a side view and a triangular form on a top view. The cutting tool 23 held on tip portion 21*a* is equipped with plate-shaped shank 23*b* whose tip is triangle on the top view and with working tip 23*c* fixed on a tip portion of the shank 23*b*. Among them, shank 23*b* is a supporting member formed by, for example, hard metal or high-speed steel, and it is light in weight and is hardly bent. Further, the working tip 23*c* is a tip made of diamond which is fixed on the tip portion of shank 23*b* through brazing. The cutting tool 23 itself is embedded into end face 21*d* of tip portion 21*a* to be fixed, and the tip 23*a* of the working tip 23*c* is arranged on an extension of tool axis AX. Further, the working tip 23*c* and the shank 23*b* that supports the working tip 23*c* are arranged inside a wedge-shaped space having open angle θ formed by extension lines of wedge side faces (right and left side faces) of tip portion 21*a*. In this case, the open angle θ of the tip portion 21*a* is selected to be within a range, for example, of 20°-90°, and a form of the tip can be changed properly to a half circle or a swordtip following a shape of processing purpose.

Root portion 23*e* of cutting tool 23, namely, of shank 23*b* is inserted to be fit in slit-shaped groove 21*f* having a rectangular section engraved in XZ plane along tool axis AX from end face 21*d* of tip portion 21*a*, and it is fixed firmly on the tip portion 21*a* by two fixing screws 25 and 26 made of the same material as that of tool portion 21, on a detachable basis. In concrete terms, fixing screws 25 and 26 are successively screwed respectively into fixing holes 21*g* and 21*h* passing through upper and lower side surfaces of the tip portion 21*a*, for the aforesaid fixing. These fixing holes 21*g* and 21*h* are extended in the Y axis direction, and the tightening direction for each of them is perpendicular to the tool axis AX. Both fixing holes 21*g* and 21*h* are different each other in terms of their inside diameters, and an inside diameter of the fixing hole 21*g* is greater than that of the fixing hole 21*h*. Both fixing holes 21*g* and 21*h* are filled respectively with both fixing screws 25 and 26 through screwing. In other words, an arrangement is made so that a deep recessed portion may not be left or a high convex portion may not be formed on positions of the fixing holes 21*g* and 21*h*. The fixing screw 25 on one side to be screwed in the fixing hole 21*h* is a joining member for fixing the cutting tool 23, and it is a TORX screw including male screw portion 25*b* and head portion 25*a*. When the head portion 25 is screwed by an appropriate tool under the condition that the male screw portion 25*b* is inserted in the fixing hole 21*g*, the male screw portion 25*b* passes through opening 23*h* formed at root portion 23*e* and is engaged with a female screw on an inner surface of fixing hole 21*h* formed in the inner part of the fixing hole 21*g*. In this case, the root portion 23*e* of cutting tool 23 is interposed between head portion 25*a* and an inner surface of slit-shaped groove 21*f* to be tightened, and the root portion 23*e* is fixed from the primary surface side, whereby, separation of the cutting tool 23 is prevented and fixing of the cutting tool 23 is secured. Fixing screw 26 on the other side to be screwed into fixing hole 21*g* is the so-called worm screw, and it functions as a setting member for preventing the fixing screw 25 from coming off. When an upper end of this fixing screw 26 is screwed by an appropriate tool while its lower end is positioned at the fixing hole 21*g*, the fixing screw 26 is engaged with a female screw on the inner surface of the fixing hole 21*g* and it is screwed in the fixing hole 21*g* to fill the inside thereof.

The fixing screw 26 thus screwed-in tightens the fixing screw 25 at the upper end, and the fixing screw 25 is prevented from loosening. In the foregoing, fixing holes 21g and 21h and fixing screws 25 and 26 serve as a fixing device to fix cutting tool 23 on tool portion 21.

In the vibration cutting unit 20 of the present embodiment explained above, root portion PE of holding members 82b, 82c, 85b and 85c for supporting vibration bodies 82 and 85 is fixed on fixed portion FP for node portions NP1 and NP2 which are common to axial vibration and bending vibration on a jointless basis. Therefore, node portions NP1 and NP2, namely, vibration body main parts 82a and 85a are firmly fixed, vibration body main parts 82a and 85a are supported stably, and vibrations of the vibration body main parts 82a and 85a are stabilized. In other words, vibrations under the mode where the vibration body main parts 82a and 85a cannot be controlled can be suppressed, and works representing objects to be processed can be processed accurately. Further, even when a relatively large force is applied on each of the vibration body main parts 82a and 85a, a change in relative position of each of the vibration body main parts 82a and 85a for case member 86 is hardly caused. Thus, the state of vibrations of the vibration body main parts 82a and 85a can be maintained, and consistency of processing for the work and reproducibility can be enhanced.

Incidentally, even when the vibration body main parts 82a and 85a vibrate, forces for displacement in Y direction and Z direction are not applied on root portion PE on holding members 82b, 82c, 85b and 85c as in the foregoing, and a force to twist around axis SX that is parallel to X axis caused by bending vibration is applied. However, an amplitude of bending vibration is small, and because of elastic deformation of holding members 82b, 82c, 85b and 85c it is possible to prevent that bending vibration of the vibration body main parts 82a and 85a is interfered. In this case, if root portion PE for holding members 82b, 82c, 85b and 85c is made to be narrow, possibility to restrain bending vibration of the vibration body main parts 82a and 85a and energy loss can be reduced, but if the root portion is made to be too narrow, there is a possibility to cause a decline of strength for holding members 82b, 82c, 85b and 85c and further for vibration bodies 82 and 85. On the other hand, if root portion PE for holding members 82b, 82c, 85b and 85c is made to be thick, it is possible to improve strength of holding members 82b, 82c, 85b and 85c and further of vibration body for cutting 82, but, it may increase a possibility to restrain bending vibration of the vibration body main parts 82a and 85a and to increase energy loss. Therefore, it is necessary to establish properly a size of root portion PE for holding members 82b 82c, 85b and 85c, so that the size may match the state of vibration including the state of a frequency and an amplitude in the case of operating vibration body main parts 82a and 85a actually.

Each of FIGS. 5-7 is a diagram illustrating variations of flange portion 82e shown in FIG. 3. Incidentally, flange portion 85e can also be varied in the same way as in flange portion 82e. FIGS. 5 (*a*) and FIG. 5 (*b*) are respectively an end face diagram and a side view for flange portion 182e of the first variation example. This flange portion 182e is a plate-shaped rectangle, and through female screws FS are formed at two locations on both end portions in the longitudinal direction. In each of both female screws FS, a tip of bolt screw 91 is screwed in through hole TH provided on side wall portion 86a of case member 86, in the same way as in the occasion shown in FIG. 1, then, an end surface of flange portion 182e is made to be in contact with an inner surface of side wall portion 86a to be fixed firmly, and holding members 82b and 82c, namely, vibration body assembly 120 is positioned on case member 86 accurately, to be fixed. In this case, the vibration body assembly 120 can be fixed on case member 86 simply, only by providing two holes TH on side wall portion 86a for each of holding members 82b and 82c.

FIG. 5 (*c*) and FIG. 5 (*d*) are respectively an end face diagram and a side view of flange portion 282e of the second variation example. This flange portion 282e is disc-shaped, and cylindrical projection 282f is provided at the center of the end surface. The flange portion 282e and the projection 282f are formed integrally, thus, strength and accuracy can be enhanced simply. At the center of the projection 282f, there is formed female screw FS2 to be in parallel with axes of holding members 82b and 82c. This projection 282f engages with hole TH provided on side wall portion 86a of case member 86. In the female screw FS2, there is screwed bolt screw 91 that is the same as that shown in FIG. 1. In other words, side wall portion 86a of case member 86 is interposed between flange portion 282e and bolt screw 91 to be fixed, and holding members 82b and 82c, namely, vibration body assembly 120 is positioned accurately on the case member 86 to be fixed. In this case, the female screw FS2 provided on the projection 282f and the bolt screw 91 serve as a connecting device that fixes tips of the holding members 82b and 82c. In this case, it is possible to fix vibration body assembly 120 simply on case member 86, only by providing one hole TH on side wall portion 86a for each of holding members 82b and 82c. Meanwhile, in the case of this example of variation, side wall portion 86a on one side and bottom portion 86b among case member 86 are formed integrally, while, side wall portion 86a on the other side is fixed on bottom portion 86b by a bolt and a screw, on a detachable basis. Owing to this, projection 282f extending from tips of holding members 82b and 82c can be inserted into hole TH provided on paired side wall portions 86a.

FIG. 5 (*e*) and FIG. 5 (*f*) are respectively an end face diagram and a side view of flange portion 382e of the third variation example. This flange portion 382e is in a form of a square, and four screw portions 382g which are projected cylindrically are provided at four corners of the square. Each screw portion 382g is a screw member that has the same form as that of a screw member of bolt screw 91 shown in FIG. 1 and serves as a connecting member. The flange portion 382e and the screw portion 382g are formed integrally to be capable of enhancing strength and accuracy in a simple way. This screw portion 382g is inserted into hole TH provided on side wall portion 86a of case member 86. A tip of the screw portion 382g is screwed in a nut. In other words, side wall portion 86a of case member 86 is interposed between the flange portion 382e and a nut (not shown) tightened on the screw portion 382g to be fixed, and thereby, holding members 82b and 82c, namely, vibration body assembly 120 is positioned precisely on the case member 86 to be fixed. In this case, the screw portion 382g provided on flange portion 382e and the nut engaged with the screw portion 382g serve as a connecting device that fixes tips of holding members 82b and 82c. Meanwhile, in the case of this example of variation, side wall portion 86a on one side and bottom portion 86b among case members 86 are formed integrally, while, side wall portion 86a on the other side is fixed on bottom portion 86b by a bolt and a screw, on a detachable basis. Owing to this, the screw portion 382g extending from tips of holding members 82b and 82c can be inserted into hole TH provided on paired side wall portions 86a.

FIG. 5 (*g*) and FIG. 5 (*h*) are respectively an end face diagram and a side view of flange portion 482e of the fourth variation example. This flange portion 482e is in a form of a plate-shaped rectangle, and two screw portions 482g which are projected cylindrically are provided at both ends in the longitudinal direction. Each screw portion 482g is a screw member that has the same form as that of a screw member of bolt screw 91 shown in FIG. 1 and serves as a connecting member. The flange portion 482e and the screw portion 482g are formed integrally to be capable of enhancing strength and accuracy in a simple way. This screw portion 482g is inserted into hole TH provided on side wall portion 86a of case member 86. A tip of the screw portion 482g is screwed in a nut. In other words, side wall portion 86a of case member 86 is interposed between the flange portion 482e and a nut (not shown) tightened on the screw portion 482g to be fixed, and thereby, holding members 82b and 82c, namely, vibration body assembly 120 is positioned precisely on the case member 86 to be fixed. Meanwhile, in the case of this example of variation, side wall portion 86a on one side and bottom portion 86b among case members 86 are formed integrally, while, side wall portion 86a on the other side is fixed on bottom portion 86b by a bolt and a screw, on a detachable basis. Owing to this, the screw portion 482g extending from tips of holding members 82b or 82c can be inserted into hole TH provided on paired side wall portions 86a.

FIG. 5 (*i*) and FIG. 5 (*j*) are respectively an end face diagram and a side view of flange portion 582e of the fifth variation example. This flange portion 582e is in a form of a disc, and projecting one cylindrical screw portion 582g is provided at the center of the end surface. This screw portion 582g is a screw member that has the same form as that of a screw member of bolt screw 91 shown in FIG. 1 and serves as a connecting member. The flange portion 582e and the screw portion 582g are formed integrally to be capable of enhancing strength and accuracy in a simple way. This screw portion 582g is inserted into hole TH provided on side wall portion 86a of case member 86. A tip of the screw portion 582g is screwed in a nut. In other words, side wall portion 86a of case member 86 is interposed between the flange portion 582e and a nut (not shown) tightened on the screw portion 582g to be fixed, and thereby, holding members 82b and 82c of case member 86, namely, vibration body assembly 120 is positioned precisely on the case member 86 to be fixed. Meanwhile, in the case of this example of variation, side wall portion 86a on one side and bottom portion 86b among case members 86 are formed integrally, while, side wall portion 86a on the other side is fixed on bottom portion 86b by a bolt and a screw, on a detachable basis. Owing to this, the screw portion 582g extending from tips of holding members 82b and 82c can be inserted into hole TH provided on paired side wall portions 86a.

FIG. 6 (*a*) and FIG. 6 (*b*) are respectively an end face diagram and a side view of the sixth variation example. Illustrated fixed end 682j is one wherein flange portion 282e is eliminated from tips of holding members 82b and 82c shown respectively in FIG. 5 (*c*) and 5 (*d*). In this case, projection 682f engages with hole TH provided on side wall portion 86a of case member 86. In female screw FS2, there is screwed bolt screw 91 which is the same as that shown in FIG. 1. However, it is possible to fix vibration body assembly 120 on case member 86 by pulling both holding members 82b and 82c from paired side wall portions 86a provided on case member 86, because there is nothing corresponding to flange portion 282e. Meanwhile, in the case of this example of variation, side wall portion 86a on one side and bottom portion 86b among the case members 86 are formed integrally, while, side wall portion 86a on the other side is fixed on bottom portion 86b by a bolt and a screw, on a detachable basis. Owing to this, projection 682f extending from tips of holding members 82b and 82c can be inserted into hole TH provided on paired side wall portions 86a.

FIG. 6 (*c*) and FIG. 6 (*d*) are respectively an end face diagram and a side view of the seventh variation example. Illustrated fixed end 782j is one wherein flange portion 582e is eliminated from tips of holding members 82b and 82c shown respectively in FIG. 5 (*i*) and 5 (*j*). In this case, screw portion 782g is inserted in hole TH provided on side wall portion 86a of case member 86. A nut is tightened on the tip of screw portion 782g. However, it is possible to fix vibration body assembly 120 on case member 86 by pulling both holding members 82b and 82c from paired side wall portions 86a provided on case member 86, because there is nothing corresponding to flange portion 582e. Meanwhile, in the case of this example of variation, side wall portion 86a on one side and bottom portion 86b among case members 86 are formed integrally, while, side wall portion 86a on the other side is fixed on bottom portion 86b by a bolt and a screw, on a detachable basis. Owing to this, screw portion 782g extending from tips of holding members 82b or 82c can be inserted into hole TH provided on paired side wall portions 86a.

FIG. 7 (*a*) and FIG. 7 (*b*) are respectively an end face diagram and a cross-sectional view taken on line A-A of flange portion 882e in the eighth variation example. The flange portion 882e is in a square form, and through holes VH are formed at four corners on the square. Bolt screw 91 shown in FIG. 1 passes through each hole VH, and nut 92 is tightened on a tip of the bolt screw 91. In other words, side wall portion 86a of case member 86 and flange portion 882e are tightened by bolt screw 91 and nut 92 to be fixed, and thereby, holding members 82b and 82c, namely, vibration body assembly 120 is positioned precisely on the case member 86 to be fixed. In this case, the bolt screw 91 and the nut 92 serve as a connecting device for fixing tips of holding members 82b and 82c.

FIG. 7 (*c*) and FIG. 7 (*d*) are respectively an end face diagram and a cross-sectional view taken on line B-B of flange portion 982e in the ninth variation example. The flange portion 982e is a plate-shaped rectangle, and through holes VH are formed at two locations on both end portions in the longitudinal direction. Bolt screw 91 shown in FIG. 1 passes through each hole VH, and nut 92 is tightened on a tip of the bolt screw 91. In other words, side wall portion 86a of case member 86 and flange portion 982e are tightened by bolt screw 91 and nut 92 to be fixed, and thereby, holding members 82b and 82c, namely, vibration body assembly 120 is positioned precisely on the case member 86 to be fixed.

FIG. 7 (*e*) and FIG. 7 (*f*) are respectively an end face diagram and a cross-sectional view taken on line C-C of flange portion 1082e in the tenth variation example. The flange portion 1082e is a plate-shaped rectangle, and through hole VH is formed at one location on one end portion in the longitudinal direction. Bolt screw 91 shown in FIG. 1 passes through the hole VH, and nut 92 is tightened on a tip of the bolt screw 91. In other words, side wall portion 86a of case member 86 and flange portion 1082e are tightened by bolt screw 91 and nut 92 to be fixed, and thereby, holding members 82b and 82c, namely, vibration body assembly 120 is positioned precisely on the case member 86 to be fixed.

FIG. 8 is a cross-sectional view of flange portion 1182e in eleventh variation example, which corresponds to FIG. 7 (*b*). In this case, holding members 82b and 82c extend not in a linear form but in a crank form. Incidentally, holding members 82b and 82c shown in each of FIGS. 7 (*d*) and 7 (*e*) also can extend in a crank form. Further, holding members 82b and 82c shown in FIG. 2 or the like also can extend in a crank form.

Meanwhile, not only holding members 82b and 82c but also holding members 85b and 85c can be changed in terms of form, in the same way, though the explanation for details is omitted.

Second Embodiment

A processing apparatus relating to the second embodiment of the invention will be explained as follows, referring to the drawings. FIG. 9 is a block diagram illustrating conceptually the structure of a processing apparatus of a vibration cutting type that processes an optical surface of a molding die which molds an optical element such as a lens.

As shown in FIG. 9, processing apparatus 10 is equipped with vibration cutting unit 20 for cutting work W representing an object to be processed, NC drive mechanism 30 that supports the vibration cutting unit 20 for the work W, drive control device 40 that controls operations of the NC drive mechanism 30, oscillator driving device 50 that gives desired vibrations to the vibration cutting unit 20, gas supply device 60 that supplies gas for cooling to the vibration cutting unit 20 and main control device 70 that controls operations of the total apparatus on a general control basis.

The vibration cutting unit 20 is a vibration cutting tool wherein cutting tool 23 is embedded in the tip of tool portion 21 extending in the Z direction, and high frequency vibrations of this cutting tool 23 cut the work W efficiently. The vibration cutting unit 20 has the structure explained in the first embodiment.

The NC drive mechanism 30 is a driving device having the structure wherein first stage 32 and second stage 33 are placed on pedestal 31. The first stage 32 supports first movable portion 35 which supports the work W indirectly through chuck 37. The first stage 32 can move the work W to the desired position at desired speed in, for example, the Z direction. Further, the first movable portion 35 can rotates the work W around horizontal axis of rotation RA at the desired speed. On the other hand, the second stage 33 supports second movable portion 36 which supports the vibration cutting unit 20. The second stage 33 can support the second movable portion 36 and the vibration cutting unit 20, and can move these to the desired positions along X axis direction or Y axis direction, at the desired speed. Further, the second movable portion 36 can rotate the vibration cutting unit 20 around vertical pivot axis PX that is in parallel with Y axis by a desired amount of angle at the desired speed. In particular, it is possible to rotate the vibration cutting unit 20 around its tip point by a desired angle by arranging the tip point of the vibration cutting unit 20 on the vertical pivot axis PX after adjusting properly a fixing position and angle of the vibration cutting unit 20 for the second movable portion 36.

Incidentally, in the aforesaid NC drive mechanism 30, the first stage 32 and the first movable portion 35 constitute a work driving portion that drives the work W, while, the second stage 33 and the second movable portion 36 constitute a tool driving portion that drives the vibration cutting unit 20.

The drive control device 40 is one to make highly accurate numerical control possible, and it operates properly the first stage 32, the second stage 33, the first movable portion 35 and the second movable portion 36 to the aimed states, by driving a motor and a position sensor housed in NC drive mechanism 30 under the control of the main control device 70. For example, while moving (feeding operation), at a low speed, a processing point of the tip of cutting tool 23 provided on a tip of tool portion 21 of vibration cutting unit 20, relatively to work W, along the prescribed locus established in a plane parallel to XZ plane, by the first stage 32 and the second stage 33, it is possible to rotate the work W at high speed around horizontal axis of rotation RA by the first movable portion 35. As a result, NC drive mechanism 30 can be utilized as a highly precise lathe under the control by drive control device 40. In this case, the tip of cutting tool 23 can be rotated properly around vertical pivot axis PX, with a processing point corresponding to the tip of cutting tool 23 serving as a center by the second movable portion 36, thus, the tip of cutting tool 23 can be set to the desired posture (inclination) for the point of work W to be processed.

Oscillator drive device 50 is one to supply electric power to a vibration source built in vibration cutting unit 20, and it can vibrate the tip of tool portion 21 at desired frequency and desired amplitude under the control of main control device 70, with a built-in oscillation circuit and a PLL circuit. Incidentally, a tip of the tool portion 21 is capable of conducting a bending vibration in the direction perpendicular to the axis (namely, tool axis AX extending in the direction of a depth of cut), and a vibration in the axial direction, and its two-dimensional vibration and three-dimensional vibration make it possible to conduct minute and efficient processing in which the tip of the tool portion 21, that is, the cutting tool 23 faces a surface of the work W.

Gas supply device 60 is one to cool the vibration cutting unit 20, and it is equipped with gaseous fluid source 61 that supplies pressurized dry air, temperature adjusting portion 63 serving as a temperature adjusting device that allows the passage of pressurized dry air coming from the gaseous fluid source 61 to adjust its temperature and flow rate adjusting portion 65 serving as a flow rate adjusting device that adjusts the flow rate of pressurized dry air having passed through the temperature adjusting portion 63. In this case, the gaseous fluid source 61 feeds air into a drying machine employing, for example, a thermal process or a dessicator to dry the air, and pressure of the dried air is enhanced by a compressor to the desired pressure. Further, temperature adjusting portion 63 that is not illustrated has, for example, flow channels for circulating coolants to peripheries and temperature sensors provided on the half way of the flow channels, and it can adjust pressurized dry air that has passed through the flow channel to the desired temperature by adjusting temperature and an amount of supply of the coolant. In addition, the flow rate adjusting portion 65 has, for example, a valve or a flow controller (not shown), and it can adjust a flow rate in the case of supplying the temperature-adjusted pressurized dry air to vibration cutting unit 20.

FIG. 10 is an enlarged top view for illustrating how work W is processed by processing apparatus 10 shown in FIG. 9. Tip portion 21a of tool portion 21 vibrates at high speed on YZ plane, for example, as explained already. Further, the tip portion 21a of tool portion 21 is moved gradually on XZ plane for work W representing an object to be processed by NC drive mechanism 30 shown in FIG. 9, while drawing the prescribed locus. That is, feeding operations for the tool portion 21 are conducted. Further, the work W representing an object to be processed is rotated at the constant speed around rotation axis RA that is in parallel with Z axis, by NC drive mechanism 30 shown in FIG. 9 (see FIG. 9). Owing to this, lathing processing for work W is made possible, and it is possible to form, for example, surface to be processed SA (for example, stepped surface such as phase element surface in addition to curved surface such as concavoconvex spherical surface and aspheric surface) that is rotation-symmetrical around rotation axis RA for the work W. In this case, vibration surface (elliptic orbit EO) of the tip of cutting tool 23 is made to be perpendicular substantially to the surface to be processed SA which is to be formed on the work W, by rotating the tip of cutting tool 23 of tool portion 21 around pivot axis PX that is in parallel with Y axis direction by the use of second stage 33. Owing to this, a processing point on the cutting edge of cutting tool 23 can be maintained at one point substantially during processing, whereby, efficient transmission of vibration to the processing point and highly accurate vibration cutting that depends on no cutting edge form can be realized, thus, processing accuracy for surface SA to be processed can be enhanced, and surface SA to be processed can be made to be more smooth. Further, since pressurized dry air is jetted at high speed toward the tip of cutting tool 23 from opening 95a on the tip of tool portion 21 in the course of processing of work W, it is possible not only to cool cutting tool 23 and surface SA to be processed efficiently but also to make temperatures of cutting tool 23 and of surface SA to be processed to be within a certain range by temperature and flow rate of pressurized dry air. Since this pressurized dry air is introduced via through hole 95 that passes through a center of axle of tool portion 21, to flow through insides of vibration body for cutting 82, axial oscillator 83 and counterbalance 85, temperatures of vibration body for cutting 82 and others can be adjusted by temperature and flow rate of the pressurized dry air. Temperatures of the vibration body for cutting 82 can be stabilized by adjusting the temperature of the pressurized dry air as stated above, and a surface subjected to cutting work having high accuracy and high reproducibility can be obtained.

Third Embodiment

A molding die relating to the third embodiment of the invention will be explained as follows. FIG. 11 is a diagram illustrating an molding die (molding die for optical element) prepared by using vibration cutting unit 20 in the first embodiment, in which FIG. 11 (a) is a side sectional view of a fixed mold that is first mold 2A, and FIG. 11 (b) is a side sectional view of a movable mold that is second mold 2B. Optical surfaces 3a and 3b respectively of both molds 2A and 2B are those subjected to finishing processing conducted by processing apparatuses 10 shown in FIG. 9 or the like. In other words, a base material (material is, for example, hard metal) for each of both molds 2A and 2B is fixed on chuck 37 as work W, and oscillator driving device 50 is operated to vibrate cutting tool 23 at high speed while forming standing waves on vibration cutting unit 20. Simultaneously with this, drive control device 40 is operated appropriately to move optionally the tip of tool portion 21 of vibration cutting unit 20 for work W on a three-dimensional basis. Due to this, transfer optical surfaces 3a and 3b respectively of both molds 2A and 2B can be made to be a stepped surface, a phase structure surface and a diffractive structure surface without being limited to a spherical surface and an aspheric surface.

FIG. 12 is a sectional view of lens L press-molded by the use of mold 2A shown in FIG. 11 (a) and mold 2B shown in FIG. 11 (b). When optical surfaces 3a and 3b respectively of molds 2A and 2B have a stepped surface, a phase structure surface and a diffractive structure surface, the formed optical surfaces of lens L also have a stepped surface, a phase structure surface and a diffractive structure surface. Further, a material of lens L can be glass without being limited to plastic. Incidentally, lens L can also be made directly by processing apparatus 10 in the second embodiment.

Specific processing examples employing vibration cutting unit 20 and processing apparatus 10 in the aforesaid embodiments will be explained as follows.

First Example

In this case, there will be explained details of processing examples employing vibration cutting unit 20 wherein vibration body 82 and holding members 82b, 82c, 85b and 85c are formed integrally. In the present example, a super precision processing machine which is the same as processing apparatus 10 shown in FIG. 9 and has pivot axis PX was used, and transfer optical surfaces similar to transfer optical surfaces 3a and 3b respectively of molds 2A and 2B shown in FIG. 11 were processed through lathing.

Micro Alloy F (HV1850) manufactured by Tungaloy Corporation was used as a material of work W that is a mold representing an object to be processed. A form of an aspheric optical surface to be processed is a small and deep concave optical surface whose approximation R concave is about 0.9 mm, a central radius of curvature is 1.33 mm and a maximum estimated angle is 65°.

A surface to become an optical surface of an object to be processed is processed to become a concave spherical surface through an electron discharge method in advance, and further, a versatile high-precision grinding machine whose axial resolution power is about 100 nm was used to conduct crude processing for changing from an approximate spherical surface form to an aspheric surface form. In this crude grinding processing, an electrodeposition grindstone was used to repeat form correction to finish to the aspheric surface form by grinding to the level of about 1 μm in terms of form accuracy in a short period of time.

Next, in processing apparatus 10, grinding finish processing was conducted by using vibration cutting unit 20. A diamond tool, namely, processing tip 23a of cutting tool 23 is R cutting tool wherein tip cutting face S1 (a cutting face is a surface that contributes to cutting of a material to be subjected to cutting processing in cutting tool 23 as shown in FIG. 13) is 30° and its tip portion is formed to be in a circular arc form. A radius of a circular arc on the tip of a cutting face of a cutting edge provided on the tip of processing tip 23a is 0.8 mm, angle of relief α of a clearance (an angle of relief is an angle formed by a tangential line at a cutting point on a clearance S2 or on its extended line and a tangential line of processed surface at the cutting point) is 5°, an angle formed by the clearance at the cutting point is −25°, and an amount of cutting in this case is 2 μm. In the vibration cutting in the present example, it was assumed that vibration in the axial direction and vibration in the bending direction are conducted, and circular motion or elliptic motion is carried out by a cutting edge locus of the front edge of processing tip 23a. As a result, it was possible to make an amount of cutting to be several times as large as that in ordinary processing which is not vibration cutting even in the case of ductility mode cutting, because it is possible to cut in a way to scoop up with a cutting face. In this case, the cutting processing was conducted under the condition that a rotation rate of a main spindle on which work W representing an object to be processed was clamped was 340 rpm and feed rate was 0.2 mm/min. Further, pivot axis PX of a stage on which vibration cutting unit 20 was fixed was controlled, and a form creating processing was carried out in a way that the axial vibration direction and a normal line direction of a design optical surface representing a target processed form of work W may agree with each other. When the processed surface thereof was observed under a microscope, a regular cutting mark considered to be a vibration cycle of vibration cutting was observed in the same way, but scratches observed in the case of use of conventional vibration devices were not observed. When the surface roughness was measured by surface roughness measuring instrument HD3300 made by WYKO Co., regular cutting marks were observed as shown in FIG. 14, and average surface roughness was 2.65 nmRa. In FIG. 14, the axis of abscissas represents a position on a processed surface, and the axis of ordinates represents roughness on a processed surface. Form precision in mold processing for the first object was improved to 0.05 μmPV by conducting the second processing through NC program that includes the form correction wherein errors in processed form for the first processing were corrected. Further, the second optical surface was subjected to cutting processing by the use of the tool used in optical surface processing for the first object and NC program including form correction, whereby, surface roughness and form precision which are substantially the same as those in optical surface precision for the first object were obtained, and excellent processing reproducibility was confirmed.

On the other hand, processing was carried out under the aforesaid conditions, even by a conventional type vibration cutting unit of a type of vibration body fixed by usual screw-pressing force. In the case of a comparative example, when the surface of the processed object was observed under a microscope, scratches at irregular intervals were observed sporadically in addition to regular cutting marks considered to be vibration cycles of vibration cutting. Therefore, the vicinities of the scratches were measured by the surface roughness measuring instrument which is the same as the aforesaid one, a depth of the scratch was about 60 nm and average surface roughness was 13.8 nmRa. Meanwhile, in FIG. 15, the axis of abscissas represents a position on the processed surface, and the axis of ordinates represents roughness on a processed surface.

Second Example

Another processing example was carried out by lathing by the use of a super precision processing machine which is the same as processing apparatus 10 shown in FIG. 9, in the same way as in the aforesaid processing example. However, in the present example, pivot axis PX was not used, but processing by two axes of XZ was used, because of processing of blazed structure. Microalloy F (HV1850) manufactured by Tungaloy Corporation was used as a material of work W that is a mold representing an object to be processed. A form of an aspheric optical surface to be processed is a form having blaze-shaped diffractive groove, and an amount of blazed step is about 1 μm.

As a diamond tool, namely, as processing tip 23a of cutting tool 23, a swordtip-shaped cutting tool having a tip vertex angle of 30° was used. A radius of a circular arc on the tip of a cutting face of a cutting edge was 1 μm or less, an angle of relief is 5°, an angle formed by the clearance at the cutting point is −30°, and an amount of cutting in this case is 1 μm. In the vibration cutting in the present example, it was assumed that vibration in the axial direction and vibration in the bending direction are conducted, and circular motion or elliptic motion is carried out by a cutting edge locus of the front edge of processing tip 23a. As a result, it was possible to make an amount of cutting to be several times as large as that in ordinary processing which is not vibration cutting even in the case of ductility mode cutting, because it is possible to cut in a way to scoop up with cutting face S1. The rotation rate of a main spindle was 500 rpm, an amount of cutting was 100 nm and feed rate was 0.1 mm/min.

FIG. 16 shows SEM-observed image of the molding die for an optical element obtained by a processing method in the present example. As is clear from the photograph, it is possible to process an on-target blaze having neither rounded edge nor burr on the blaze edge. With respect to the roughness of the processed surface, it appears to be a mirror plane under the SEM observation. In a conventional processing apparatus and a conventional vibration cutting unit in the comparative example wherein the vibration body is fixed be being clamped by screw type supports, a cutting edge of processing tip 23a was damaged in the course of processing of a blaze, and it was impossible to process up to the aimed blazed step, because a diamond tool, namely, the processing tip 23a is made to be extremely sharp. In the case of the example, however, it was possible to improve rigidity for holding of vibration body 82, whereby, a position of the cutting edge in the course of vibration cutting was reproduced accurately, and irregular and great fluctuation of the cutting edge position which used to be one of causes for damage of cutting edge was eliminated, thus, it was possible to process the desired blaze form. Further, a molding die for optical element made of highly hard material was used for glass molding, and a glass optical element which can be corrected in terms of chromatic aberration and is highly resistant to environmental changes was obtained.

The present invention has been explained above, referring to the aforesaid embodiment to which, however, the invention is not limited. For example, in the vibration cutting unit 20, it is possible to change a form of tip portion 21a and a method of fixing cutting tool 23, according to circumstances.

Although four holding members 82b, 82c, 85b and 85c support one set of vibration bodies 82 and 85 in the aforesaid embodiment, it is also possible for two holding members 82b and 85b to support one set of vibration bodies 82 and 85. Further, when two or more node portions are formed on any one of the vibration bodies 82 and 85, it is possible to provide holding members similar to the aforesaid holding members 82b, 82c, 85b and 85c on any one location or more of the node portion, and to fix them in case member 86.

Further, in vibration cutting unit 20, a total form and dimensions of vibration body for cutting 82 and axial oscillator 83 can be changed accordingly, in accordance with application. When the vibration cutting unit 20 is not heated very much, pressurized dry air does not need to be supplied because dimensional changes of the vibration body for cutting 82 do not need to be cared. Further, in gas supply device 60 shown in FIG. 9, it is possible to use gaseous fluid wherein oil or other lubricant element other than air is added as a mist-type solvent or a particle, or to use inert gas such as nitrogen gas.

Vibration body 82 constituting vibration body assembly 20 does not need to be only one, and the number of an oscillator that excites the vibration body of this kind may also be plural or in plural pairs.

An example of the foregoing is shown in FIG. 17. In illustrated vibration body assembly 1220, second vibration body 1282 is further joined additionally to axial oscillator 83 that excites vibration body 82 in the axial direction, and second axial oscillator 1283 is joined to the second vibration body 1282. Then, third vibration body 1382 is further joined to the second axial oscillator 1283, then, third axial oscillator 1383 is joined to the third vibration body 1382, and counterbalance 85 is joined finally.

Each of these three axial oscillators 83, 1283 and 1383 is arranged at a position of an antinode of the axial vibration, and when they vibrate at the same phase, each vibration body is excited to cause resonance in the axial direction. By cascading the vibration bodies 82, 1282 and 1382 and oscillators 83, 1283 and 1383 as stated above, it is possible supply total great energy of vibration to the vibration body assembly 1220 because the number of oscillators or vibration elements can be increased, and it is further possible to maintain an amplitude stably against outer disturbance because the total mass of the vibration body assembly 1220 grows greater. In addition, energy supply for excitation is dispersed, whereby, there is no concentration of heat generation from the axial oscillators 83, 1283 and 1383, resulting in an effect that temperature rise of the vibration body assembly 1220 can be restrained.

On the other hand, also for bending vibration, paired oscillators 84 are provided at a position of the antinode of the oscillator 83 and paired oscillators 1284 are provided at a position of the antinode of the oscillator 1283, whereby, great energy of vibration can easily be maintained stably, because greater energy of vibration can be supplied to the vibration body assembly 1220 compared with an occasion of one pair.

Even in the aforesaid vibration body assembly 1220, it is possible to realize the maintenance of vibration body having extremely high rigidity, by providing flange portions 82e and 85e shown in FIG. 1 in addition to holding members 82b, 82c, 85b and 85c at a position of the common node for bending vibration and axial vibration, as an integrated supporting point.

In addition, since the greater the vibration energy is for the application, the greater the cutting resistance by heavy cutting is, the holding method for the vibration body assembly 1220 having high rigidity and no resistance to resonance like one in the aforesaid embodiment is extremely effective for stabilizing a tool position highly precisely, and is very appropriate for realizing highly accurate vibration cutting processing.

Although cutting by a lathe has been explained mainly in the aforesaid vibration cutting apparatus, vibration cutting unit 20 shown in FIG. 1 and processing apparatus 10 can also be changed for ruling processing.

What is claimed is:

1. A vibration body for cutting, comprising:
    a vibration body main part which is capable of holding a cutting tool for vibration cutting and which transmits a vibration to the cutting tool when the vibration body main part holds the cutting tool, the vibration body main part having a node portion corresponding to a vibration node relating to at least bending vibration caused along a bending vibration plane while the vibration body main part vibrates; and
    a holding member which is integrally fixed to the node portion and extends in a normal line direction of the bending vibration plane for supporting the node portion.

2. The vibration body for cutting of claim 1,
    wherein the holding member is integrally fixed to the node portion by forming the vibration body main part and the holding member integrally.

3. The vibration body for cutting of claim 1,
    wherein the holding member is integrally fixed to the node portion by forming the vibration body main part and the holding member from one block of material by means of machine work.

4. The vibration body for cutting of claim 1,
    wherein the holding member is integrally fixed to the node portion by connecting the vibration body main part and the holding member by means of welding.

5. The vibration body for cutting of claim 1,
    wherein the node portion corresponds to a vibration node relating to axial vibration and the holding member is a member extending in a vertical direction to an axial direction of the vibration body main part from the node portion.

6. The vibration body for cutting of claim 1 further comprising,
    a plurality of the holding members extending from the node portion of the vibration body main part.

7. The vibration body for cutting of claim 1,
    wherein the holding member comprises a connecting device for fixing on a tip side of the holding member.

8. The vibration body for cutting of claim 1,
    wherein each the vibrating body main part and the holding member is formed of a material whose absolute value of a linear expansion coefficient is $2 \times 10^{-6}$ or less.

9. A vibration cutting unit comprising:
    the vibration body for cutting of claim 1; and
    a case member which contains the vibration body for cutting and which has a supporting portion for fixing a tip side of the holding member.

10. The vibration cutting unit of claim 9, further comprising:
    a flange portion having contact with the supporting member of the case member from inside; and
    a connecting member for fixing the flange portion to the supporting portion on a detachable basis.

11. The vibration cutting unit of claim 10,
    wherein the connecting member includes a plurality of screws and the plurality of screws fix the flange portion to the supporting portion at a plurality of places.

12. The vibration cutting unit of claim 10,
    wherein the connecting member comprises at least one screw member installed outside the flange portion.

13. The vibration cutting unit of claim 9,
    wherein the vibration body for cutting has a plurality of the holding members extending from the vibration body main part and the case member has a plurality of supporting portions for fixing tip sides of the plurality of holding members respectively.

14. The vibration cutting unit of claim 13,
    wherein the case member is integrally formed as a main part including the plurality of supporting portions.

15. The vibration cutting unit of claim 9,
    wherein the case member, the vibration body main part and the holding member are formed of a same material.

16. The vibration cutting unit of claim 9, further comprising:
    the cutting tool held on the vibration body main part; and
    a fixing device for fixing the cutting tool to the vibration body main part on a detachable basis.

17. The vibration cutting unit of claim 16 further comprising,
    a vibration source for vibrating the cutting tool through the vibration body main part by giving a vibration to the vibration body main part.

18. A processing apparatus comprising:
    the vibration cutting unit of claim 9; and
    a driving device for displacing the vibration cutting unit.

19. The vibration body for cutting of claim 1, further comprising:
    a bending vibration source for giving a lateral wave vibration to the vibration body for cutting.

* * * * *